(12) United States Patent
Iwamoto et al.

(10) Patent No.: US 12,062,079 B2
(45) Date of Patent: Aug. 13, 2024

(54) INFORMATION PROCESSING APPARATUS, INFORMATION PROCESSING METHOD, AND NON-TRANSITORY COMPUTER READABLE MEDIUM

(71) Applicant: NEC Corporation, Tokyo (JP)

(72) Inventors: Kota Iwamoto, Tokyo (JP); Soma Shiraishi, Tokyo (JP); Shinya Yamasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 195 days.

(21) Appl. No.: 17/772,615

(22) PCT Filed: Nov. 13, 2019

(86) PCT No.: PCT/JP2019/044491
§ 371 (c)(1),
(2) Date: Apr. 28, 2022

(87) PCT Pub. No.: WO2021/095152
PCT Pub. Date: May 20, 2021

(65) Prior Publication Data
US 2022/0405822 A1 Dec. 22, 2022

(51) Int. Cl.
G06Q 30/06 (2023.01)
G06Q 30/0201 (2023.01)
G06Q 30/0601 (2023.01)

(52) U.S. Cl.
CPC ..... *G06Q 30/0629* (2013.01); *G06Q 30/0201* (2013.01)

(58) Field of Classification Search
None
See application file for complete search history.

(56) References Cited

U.S. PATENT DOCUMENTS 7,302,431 B1 * 11/2007 Apollonsky ........... G06Q 30/02
7,941,335 B2 * 5/2011 Moskowitz .......... G06Q 10/063
705/7.29

(Continued)

FOREIGN PATENT DOCUMENTS

| JP | 2015-028800 A | 2/2015 |
| JP | 2017-102602 A | 6/2017 |
| JP | 2018-136604 A | 8/2018 |

OTHER PUBLICATIONS

Anon., "Packaging in Asia—A Cultural Mix" [Abstract only], Euro Cosmetics, 10.4 Apr. 28-29, 2002. (Year: 2002).*

(Continued)

*Primary Examiner* — Nicholas D Rosen

(57) ABSTRACT

An information processing apparatus (10) includes a differential information generation unit (110) and an evaluation information output unit (120). The differential information generation unit (110) determines a combination of a first product package design and a second product package design, based on input information, and generates differential information indicating magnitude of a difference between the first product package design and the second product package design. The evaluation information output unit (120) evaluates a conspicuous degree of the difference between the first product package design and the second product package design, based on the differential information, and outputs evaluation information indicating an evaluation result of the conspicuous degree.

15 Claims, 21 Drawing Sheets

(56) References Cited

U.S. PATENT DOCUMENTS

| | | | | |
|---|---|---|---|---|
| 9,104,500 | B1* | 8/2015 | Krikellas | G06F 9/52 |
| 2005/0177388 | A1* | 8/2005 | Moskowitz | G06Q 30/0201 |
| | | | | 705/347 |
| 2013/0054342 | A1* | 2/2013 | Tseng | G06Q 30/0277 |
| | | | | 705/14.32 |
| 2013/0325323 | A1* | 12/2013 | Breed | G01C 21/3667 |
| | | | | 701/420 |
| 2017/0177285 | A1* | 6/2017 | Fujiwara | G06F 3/1285 |
| 2018/0218283 | A1* | 8/2018 | Jenson | G06Q 50/01 |
| 2019/0197571 | A1* | 6/2019 | Patel | G06Q 30/0244 |

OTHER PUBLICATIONS

Salem, M.Z., "Effects of perfume packaging on Basque female consumers purchase decision in Spain," Management Decision, 56.8: 1748-1768. Emerald Group Publishing Limited. 2018. (Year: 2018).*
Machine translation of JP 2015-028800 A, obtained from Japanese Intellectual Property Office website on Jan. 2, 2024. (Year: 2024).*
Machine translation of JP 2017-102602 A, obtained from Japanese Intellectual Property Office website on Jan. 2, 2024. (Year: 2024).*
Machine translation of JP 2018-136604 A, obtained from Japanese Intellectual Property Office website on Jan. 2, 2024. (Year: 2024).*
USPTO Science and Technology Information Center, human translation of Japanese Patent document JP 2015-028800. Jan. 29, 2024. (Year: 2024).*
International Search Report for PCT Application No. PCT/JP2019/044491, mailed on Jan. 28, 2020.

* cited by examiner

IMAGE OF NEW PRODUCT
PACKAGE DESIGN

INFORMATION PROCESSING APPARATUS, INFORMATION PROCESSING METHOD, AND NON-TRANSITORY COMPUTER READABLE MEDIUM

TECHNICAL FIELD

The present invention relates to a technique for evaluating a package design of a product.

BACKGROUND ART

A package design of a product is one of elements that affect sales for the product. One example of a technique for evaluating a package design of a product is disclosed in Patent Document 1 described below. A system for performing an evaluation of an evaluation target such as a package design of a new product is disclosed in Patent Document 1. Specifically, the system in Patent Document 1 displays a first image of an evaluation target on a terminal of an evaluator, receives an input of an attention portion in the first image and evaluation information about the attention portion, generates attention degree distribution data about the image, based on input information being received from a plurality of evaluators, and displays the first image and a second image based on the attention degree distribution data.

RELATED DOCUMENT

Patent Document

[Patent Document 1] Japanese Patent Application Publication No. 2018-136604

DISCLOSURE OF THE INVENTION

Technical Problem

A product package design may be renewed or changed for a limited period for a purpose of improving product sales and the like. When a product package design is changed, a change from a conventional product package design is preferably conspicuous in such a way as to attract attention of a consumer. However, a technique for evaluating a conspicuous degree of a change in product package design is not present.

The present invention has been made in view of the above-described problem. One of objects of the present invention is to provide a technique for evaluating a conspicuous degree of a change in product package design.

Solution to Problem

An information processing apparatus according to the present invention, including:
 a differential information generation unit that determines a combination of a first product package design and a second product package design, based on input information, and generates differential information indicating magnitude of a difference between the first product package design and the second product package design; and
 an evaluation information output unit that evaluates a conspicuous degree of the difference between the first product package design and the second product package design, based on the differential information, and outputs evaluation information indicating an evaluation result of the conspicuous degree.

An information processing method according to the present invention, including:
 by a computer,
 determining a combination of a first product package design and a second product package design, based on input information;
 generating differential information indicating magnitude of a difference between the first product package design and the second product package design;
 evaluating a conspicuous degree of the difference between the first product package design and the second product package design, based on the differential information; and
 outputting evaluation information indicating an evaluation result of the conspicuous degree.

A program according to the present invention causing a computer to execute the information processing method described above.

Advantageous Effects of Invention

The present invention provides a technique for evaluating a conspicuous degree of a change in product package design.

BRIEF DESCRIPTION OF THE DRAWINGS

The above-described object, the other objects, features, and advantages will become more apparent from suitable example embodiments described below and the following accompanying drawings.

DESCRIPTION OF EMBODIMENTS

Figure 1:
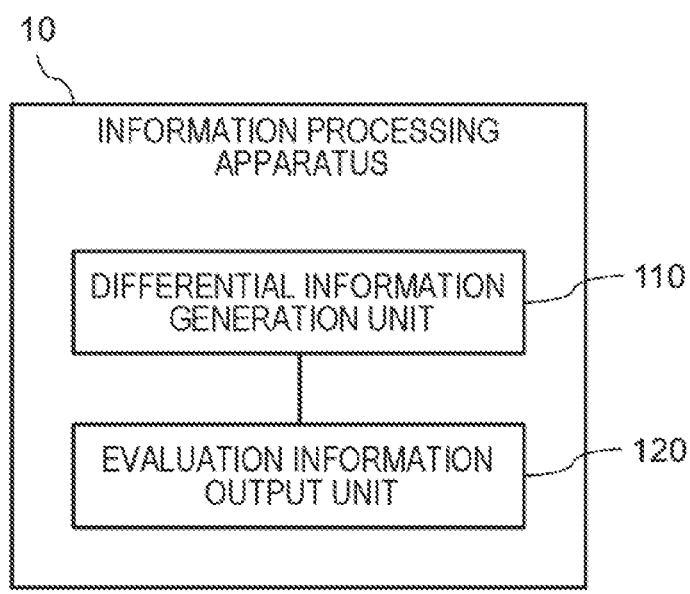
FIG. 1 is a diagram illustrating a functional configuration of an information processing apparatus according to a first example embodiment.

Hereinafter, example embodiments of the present invention will be described by using drawings. Note that, in all of the drawings, a similar component has a similar reference sign, and description thereof is not repeated as appropriate. Further, in each block diagram, each block represents a configuration of a functional unit instead of a configuration of a hardware unit unless otherwise described. Further, a direction of an arrow in the drawings is used for facilitating understanding of a flow of information, and does not limit a direction (one-way communication/two-way communication) of communication unless otherwise described.

SUMMARY OF INVENTION

First, an information processing apparatus 10 according to the present invention will be described.

Functional Configuration Example

FIG. 1 is a diagram illustrating a functional configuration of the information processing apparatus 10 according to a first example embodiment. As illustrated in FIG. 1, the information processing apparatus 10 according to the present example embodiment includes a differential information generation unit 110 and an evaluation information output unit 120.

The differential information generation unit 110 determines a combination of two product package designs to be comparison targets, based on input information. Note that, when the two product package designs are distinguished in the following description, one may also be described as a "first product package design" and the other may also be described as a "second product package design". Further, the differential information generation unit 110 generates differential information indicating magnitude of a difference between the first product package design and the second product package design.

The evaluation information output unit 120 evaluates a conspicuous degree of the difference between the first product package design and the second product package design, based on the differential information generated by the differential information generation unit 110. Further, the evaluation information output unit 120 outputs evaluation information indicating an evaluation result of the difference between the first product package design and the second product package design.

Hardware Configuration Example

The information processing apparatus 10 may be achieved by hardware (for example, a hard-wired electronic circuit and the like) that achieves each functional component unit, and may be achieved by a combination of hardware and software (for example, a combination of an electronic circuit and a program that controls the electronic circuit and the like). Hereinafter, a case where the information processing apparatus 10 is achieved by the combination of hardware and software will be further described.

Figure 2:
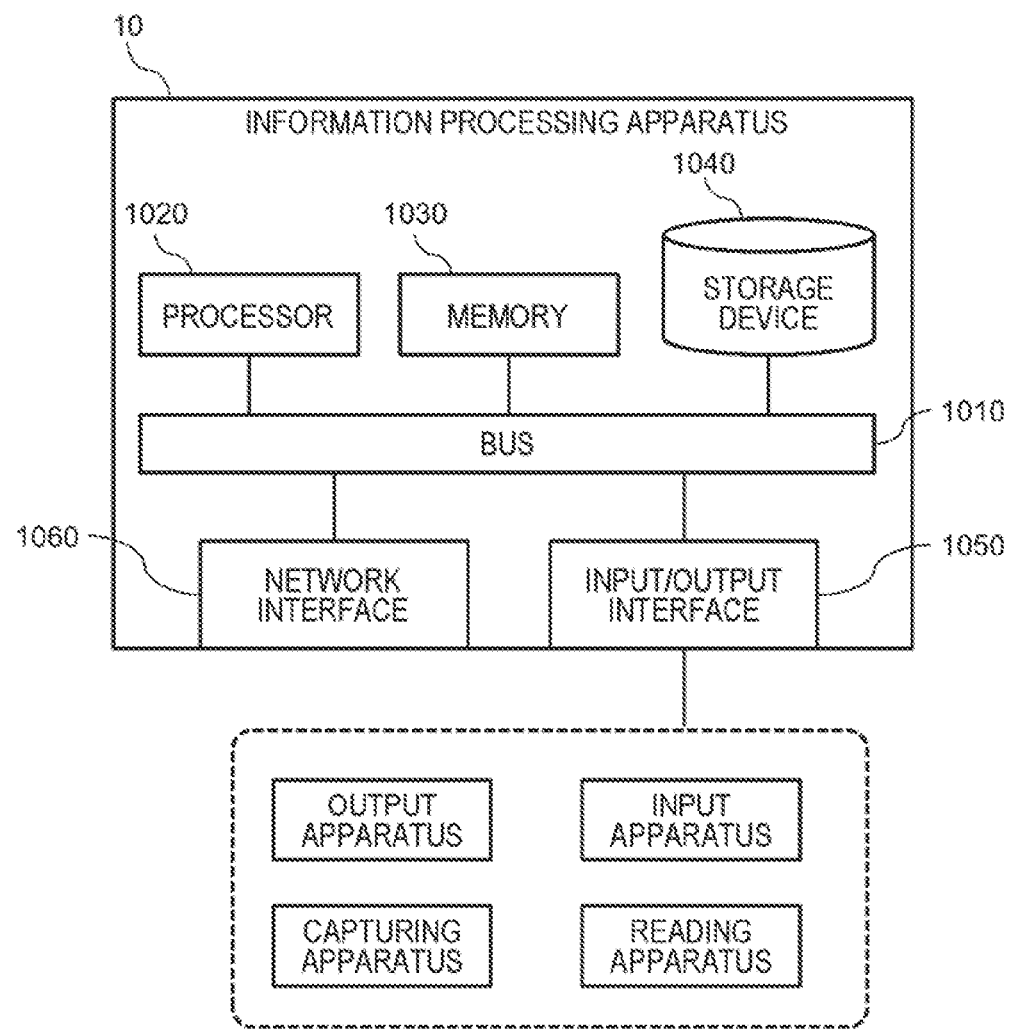
FIG. 2 is a block diagram illustrating a hardware configuration of the information processing apparatus.

FIG. 2 is a block diagram illustrating a hardware configuration of the information processing apparatus 10.

The information processing apparatus 10 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (such as the differential information generation unit 110 and the evaluation information output unit 120) of the information processing apparatus 10. The processor 1020 reads each program module onto the memory 1030 and executes each program module, and each function associated with each program module is achieved.

The input/output interface 1050 is an interface for connecting the information processing apparatus 10 to a peripheral apparatus (such as an output apparatus, an input apparatus, a capturing apparatus, and a reading apparatus). The output apparatus is, for example, a display, and the like. The input apparatus is, for example, a keyboard, a mouse, a touch panel, and the like. The capturing apparatus is a camera including an image sensor such as a charge coupled device (CCD) and a complementary metal oxide semiconductor (CMOS). The reading apparatus is an apparatus that reads a code and a tag provided to a product, such as a bar code reader and an integrated circuit (IC) tag reader.

The network interface 1060 is an interface for connecting the information processing apparatus 10 to a network. The network is, for example, a local area network (LAN) and a wide area network (WAN). A method of connection to the network by the network interface 1060 may be wireless connection or wired connection.

Note that the configuration illustrated in FIG. 2 is merely one example, and a configuration of hardware including the information processing apparatus 10 is not limited to the example in FIG. 2. At least one of the output apparatus, the input apparatus, the capturing apparatus, and the reading apparatus may be provided in another external apparatus (for example, a user terminal used by a user, or the like) connected to the information processing apparatus 10 via the network interface 1060.

<Flow of Processing>

Figure 3:
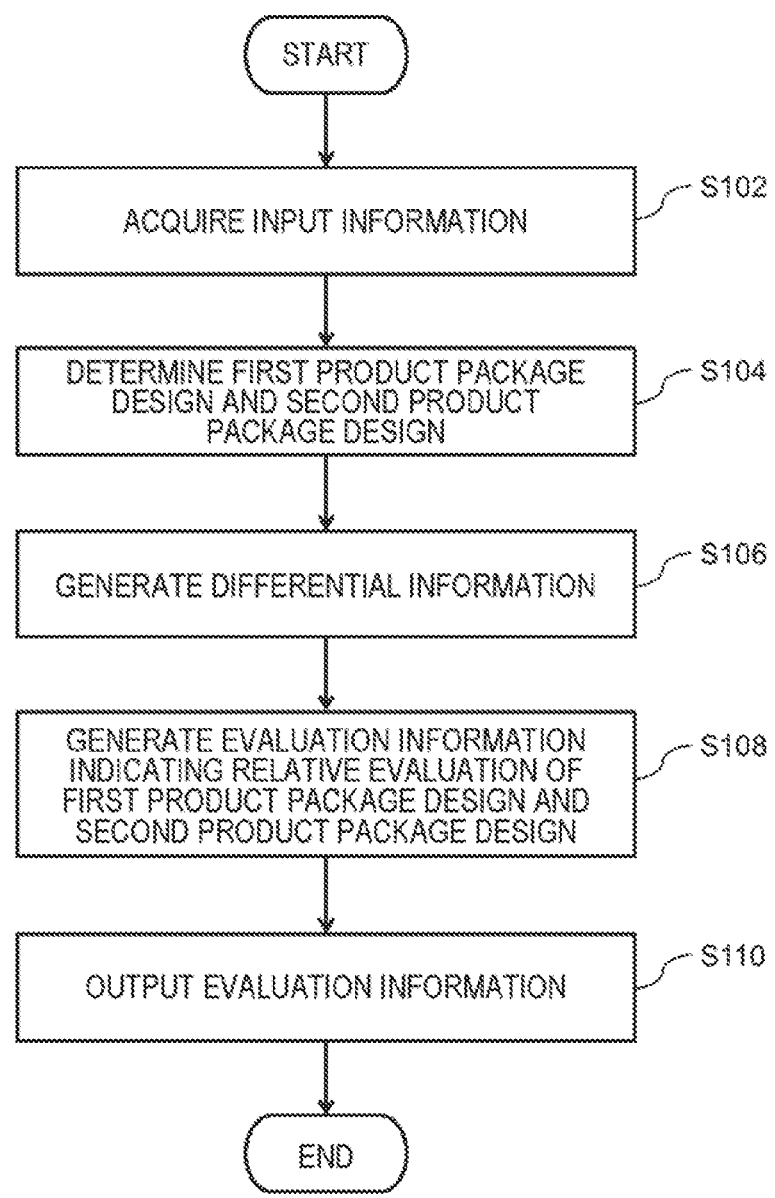
FIG. 3 is a flowchart illustrating a flow of processing performed by the information processing apparatus according to the first example embodiment.

FIG. 3 is a flowchart illustrating a flow of processing performed by the information processing apparatus 10 according to the first example embodiment.

First, the differential information generation unit 110 acquires input information (S102). The input information is generated by using the input apparatus, the capturing apparatus, or the reading apparatus. For example, the differential information generation unit 110 may acquire, as the input information, information indicating a recognition result of a product acquired by reading a bar code, an IC tag, or the like by using the reading apparatus. Further, for example, the differential information generation unit 110 may acquire, as the input information, information generated based on a specification input operation (a keyword input such as a product name, a selection input of a product icon on a screen, or the like) of a product being performed by using the input apparatus on a screen displayed on a display of the information processing apparatus 10 or a user terminal (not illustrated). Further, for example, the differential information generation unit 110 may acquire, as the input information, image data (image data in which a package design of a product is captured) about a product display space being generated by using the capturing apparatus.

Then, the differential information generation unit 110 determines a first product package design and a second product package design, based on the input information (S104). Details of the processing of the evaluation information output unit 120 for determining the first product package design and the second product package design will be described in each example embodiment described below. Then, the differential information generation unit 110 generates differential information indicating magnitude of a difference between the first product package design and the second product package design that are determined (S106).

As one example, by causing a machine learning model that is trained to be able to recognize a product of the second product package design to recognize a product of the first product package design, the differential information generation unit 110 can generate the differential information indicating magnitude of a difference between the two product package designs. First, the differential information generation unit 110 provides, as an input, an image of the first product package design to the machine learning model. The image of the first product package design input to the machine learning model is, for example, a standard image acquired by capturing the first product package design from a predetermined direction (for example: front). For example, an image database (not illustrated) that stores a standard image for each product package design is prepared in advance, and the differential information generation unit 110 is configured in such a way as to read the standard image of the first product package design from the image database, based on a determination result in the processing in S104. When the image of the first product package design is input, the machine learning model outputs a probability for each of a plurality of labels (products or product package designs) learned in advance that the first product package design belongs. Then, the differential information generation unit 110 acquires a probability of a label associated with the second product package design from the output of the machine learning model, based on the determination result in the processing in S104. Then, the differential information generation unit 110 acquires a probability of a label associated with the second product package design from the output of the machine learning model, based on the determination result in the processing in S104. Herein, a value of the probability of the label associated with the second product package design fluctuates according to a degree of similarity (a conspicuous degree of a difference) between the first product package design and the second product package design. For example, when the first product package design is clearly different from the second product package design (a difference is conspicuous), a value of the probability of the label associated with the second product package design decreases. On the other hand, when the first product package design is similar to the second product package design (a difference is inconspicuous), a value of the probability of the label associated with the second product package design increases. Thus, the probability of the label associated with the second product package design being acquired as a result of inputting the image of the first product package design to the machine learning model can be used as differential information indicating magnitude of a difference between the two product package designs.

As another example, the differential information generation unit 110 can generate the differential information by using a first spatial distribution formed by a plurality of feature values related to the first product package design and a second spatial distribution formed by a plurality of feature values related to the second product package design. For example, the differential information generation unit 110 can acquire the first spatial distribution and the second spatial distribution by extracting a plurality of feature values for each of a standard image of the first product package design and a standard image of the second product package design, and plotting the plurality of extracted feature values in a predetermined multidimensional space. In this case, an image database (not illustrated) that stores a standard image for each product package design is prepared in advance, and the differential information generation unit 110 is configured in such a way as to read the standard image of the first product package design and the second product package design from the image database, based on the determination result in the processing in S104. Further, a database (not illustrated) that stores data about a spatial distribution for each product package design may be prepared in advance. In this case, the differential information generation unit 110 can acquire data about the first spatial distribution and data about the second spatial distribution, based on the determination result in the processing in S104. Further, when an image of a product package design is acquired as input information, the differential information generation unit 110 may be configured in such a way as to extract a plurality of feature values by analyzing the image, and generate a spatial distribution of the feature values. Then, the differential information generation unit 110 can generate the differential information indicating magnitude of a difference between the first product package design and the second product package design by converting, into numbers, a difference between the acquired data about the first spatial distribution and the acquired data about the second spatial distribution.

Then, the evaluation information output unit 120 evaluates a conspicuous degree of the difference between the first product package design and the second product package design, based on the differential information generated by the differential information generation unit 110 (S108). For example, the evaluation information output unit 120 can determine that the difference between the two product package designs is more conspicuous as the difference indicated by the differential information is greater. Then, the evaluation information output unit 120 outputs evaluation information indicating an evaluation result of the conspicuous degree of the difference between the first product package design and the second product package design (S110).

The present invention evaluates a conspicuous degree of a difference between two product package designs, based on differential information indicating the difference between the two product package designs, and outputs evaluation information indicating the evaluation result. A system for supporting various types of business can be constructed by using the evaluation information. Hereinafter, a specific example of a business support system using the information processing apparatus 10 according to the present invention will be described.

First Example Embodiment

In the present example embodiment, a system for supporting development business of a product package design will be exemplified.

System Configuration Example

Figure 4:
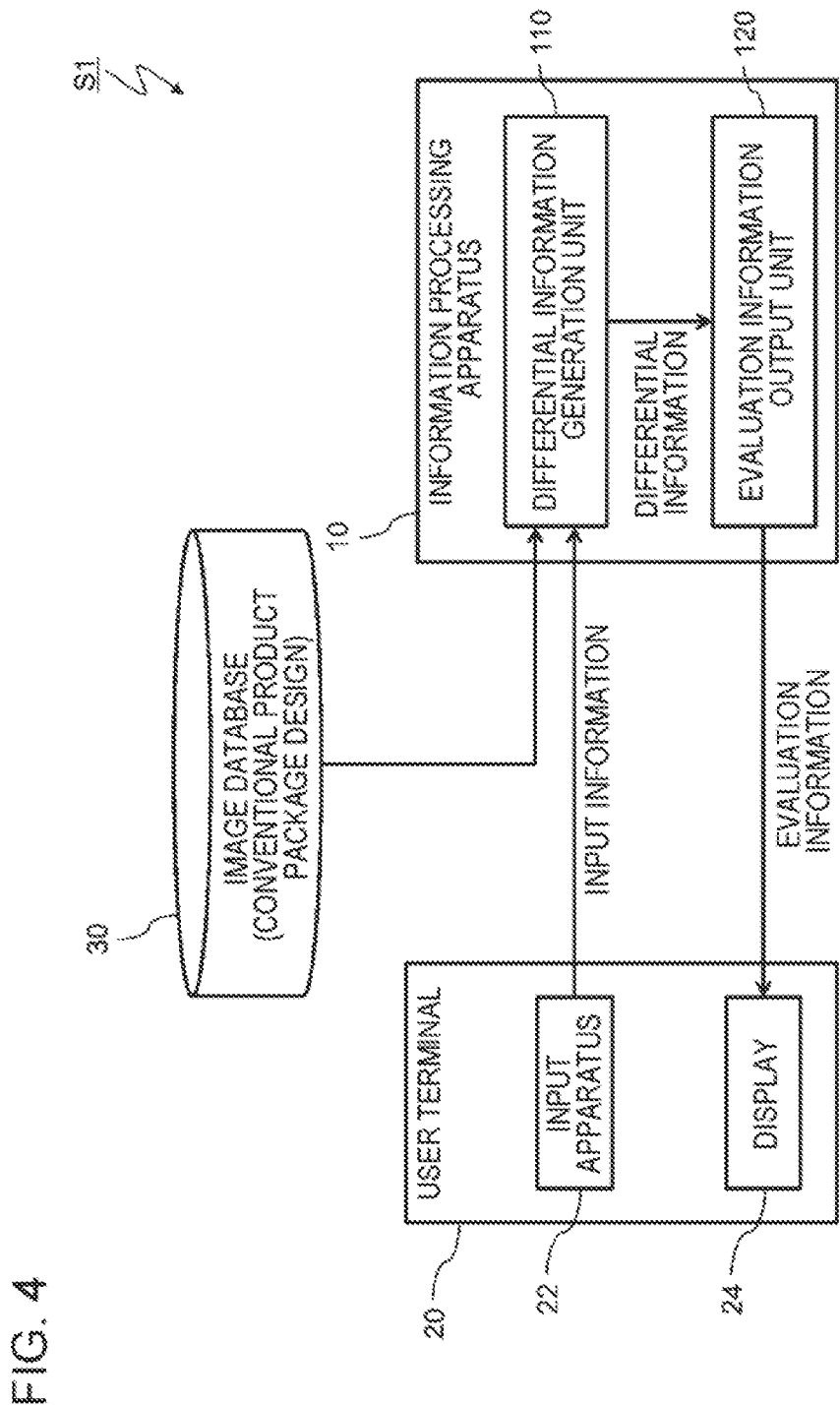
FIG. 4 is a diagram illustrating a configuration of a package design evaluation system S1 using the information processing apparatus according to the present invention.

FIG. 4 is a diagram illustrating a configuration of a package design evaluation system S1 using the information processing apparatus 10 according to the present invention. The package design evaluation system S1 illustrated in FIG. 4 is configured in such a way as to include the information processing apparatus 10, a user terminal 20, and an image database 30.

In the present example embodiment, the information processing apparatus 10 evaluates a conspicuous degree of a difference between a new product package design (first product package design) of a certain product and a conventional product package design (second product package design) of the product, and outputs, as evaluation information, information indicating the evaluation result. Details of the processing of the information processing apparatus 10 will be described later.

The user terminal 20 is a terminal for a person in charge of a design development operation. Further, an application for the package design evaluation system S1 is installed in the user terminal 20. The person in charge of the design development operation performs an operation for activating the application on the user terminal 20, and generating input information. As one example, the person in charge of the design development operation inputs an image of a new product package design (for example: a product package design for a limited period or a renewed product package design) related to a certain product by using an input apparatus 22. The image of the new product package design being input herein is transmitted together with product identification information for identifying the product to the information processing apparatus 10 via a network. Further, when the user terminal 20 receives a processing result (evaluation information related to a conspicuous degree of a difference between the new product package design and a conventional product package design) by the information processing apparatus 10, the user terminal 20 outputs the processing result to a display 24.

The image database 30 stores image data about a current product package design of each product. The information processing apparatus 10 acquires, from the image database 30, an image of the conventional product package design to be compared with the image of the new product package design acquired as input information.

<Flow of Processing>

Figure 5:
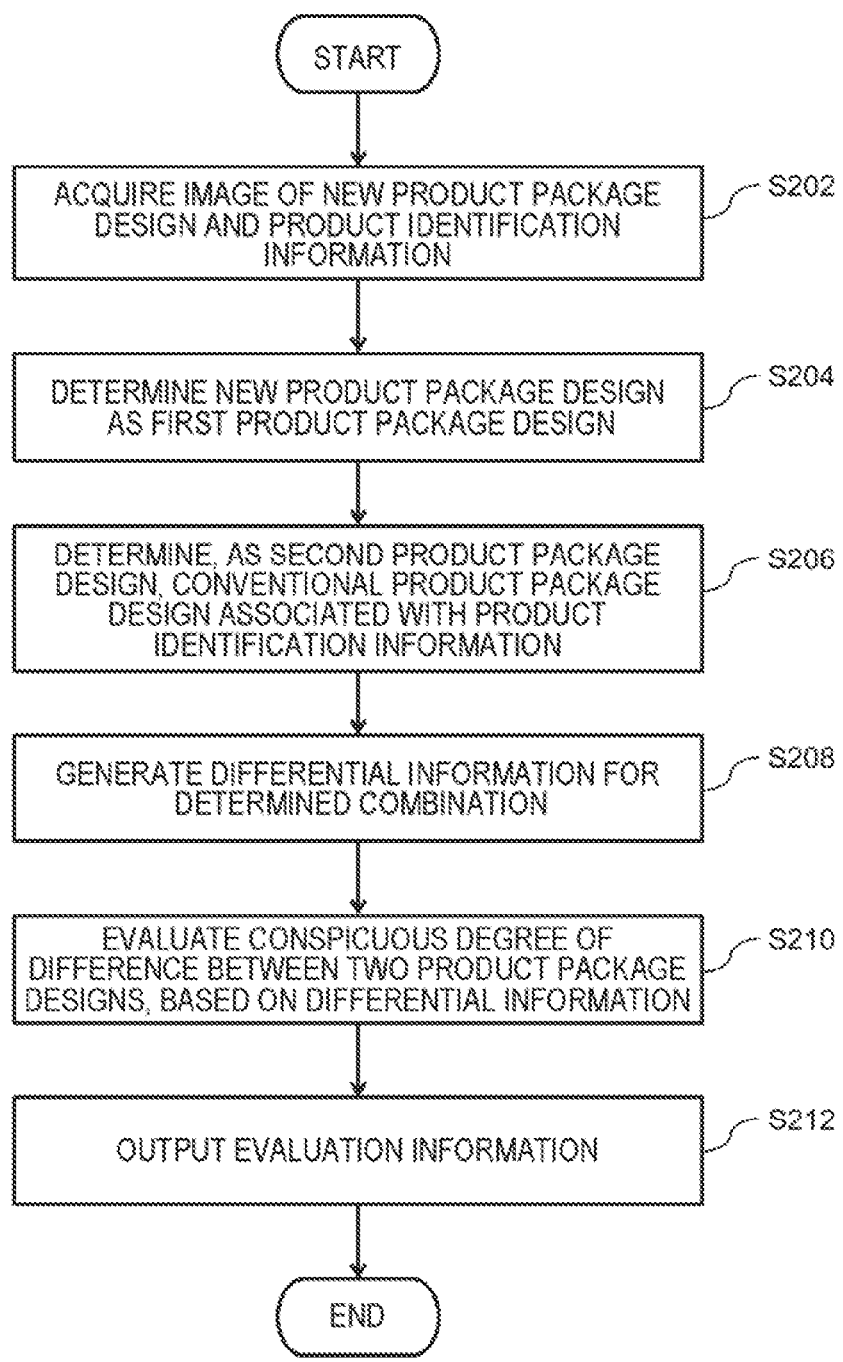
FIG. 5 is a flowchart illustrating a flow of processing performed by the information processing apparatus constituting the package design evaluation system in FIG. 4.

For example, the information processing apparatus 10 performs processing as illustrated in FIG. 5. FIG. 5 is a flowchart illustrating a flow of the processing performed by the information processing apparatus 10 constituting the package design evaluation system S1 in FIG. 4.

The differential information generation unit 110 acquires, as input information, an image of a new package design of a certain product and product identification information about the product that are transmitted from the user terminal 20 (S202). Then, the differential information generation unit 110 determines a combination of a first product package design and a second product package design, based on the input information. Specifically, the differential information generation unit 110 determines, as the first product package design, the new product package design captured in the image acquired as the input information (S204). Further, the differential information generation unit 110 reads, from the image database 30, an image of a conventional product package design associated with the product identification information acquired as the input information, and determines, as the second product package design, the conventional product package design captured in the image (S206). In this way, the combination of the new package design (first product package design) of the certain product and the conventional product package design (second product package design) is determined.

Then, the differential information generation unit 110 generates differential information for the combination determined in the processing described above (S208). For example, the differential information generation unit 110 acquires, as the differential information, a result (score that changes according to a degree of similarity between the two product package designs) of recognizing the product of the new product package design by using a machine learning model that is trained to be able to recognize the product of the conventional product package design. Further, the differential information generation unit 110 may acquire, as the differential information, a difference between a first spatial distribution formed by a plurality of feature values of the new product package design and a second spatial distribution formed by a plurality of feature values of the conventional product package design.

Then, the evaluation information output unit 120 evaluates a conspicuous degree of the difference between the new product package design and the conventional product package design, based on the differential information generated by the differential information generation unit 110, and outputs evaluation information indicating the evaluation result to the display 24 of the user terminal 20 (S210, S212).

For example, when the differential information indicates a difference equal to or less than a predetermined reference value (first reference value), the evaluation information output unit 120 determines that the difference between the new product package design and the conventional product package design (a change from the conventional product package design) is inconspicuous. Further, when the differential information indicates a difference equal to or more than a second reference value greater than the first reference value, the evaluation information output unit 120 determines that the difference between the new product package design and the conventional product package design (a change from the conventional product package design) is conspicuous. Then, the evaluation information output unit 120 outputs, to the display 24 of the user terminal 20, information indicating whether the difference between the new product package design and the conventional product package design is conspicuous.

Herein, when the differential information generation unit 110 acquires a difference between spatial distributions of feature values as the differential information, the evaluation information output unit 120 can determine a conspicuous region as a change of the image of the new product package design, based on the difference between the spatial distributions of the feature values, and can output information indicating the region. In this case, the evaluation information output unit 120 operates as follows, for example.

Figure 6:
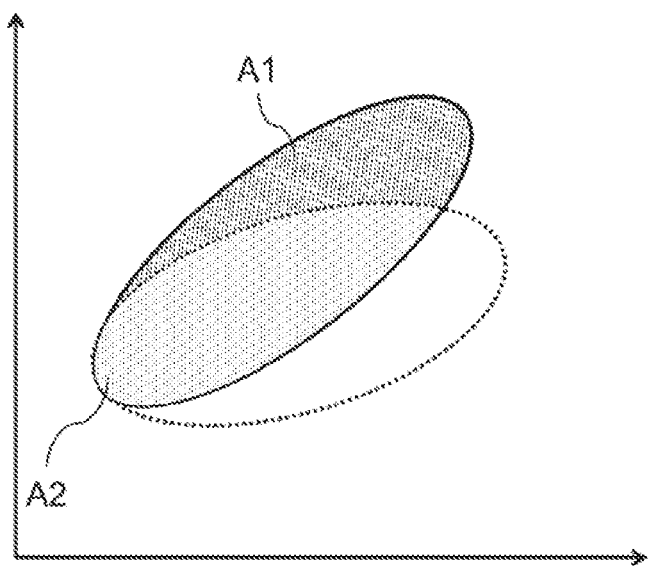
FIG. 6 is a diagram illustrating a first spatial distribution and a second spatial distribution in a two-dimensional feature value space.
Figure 7:
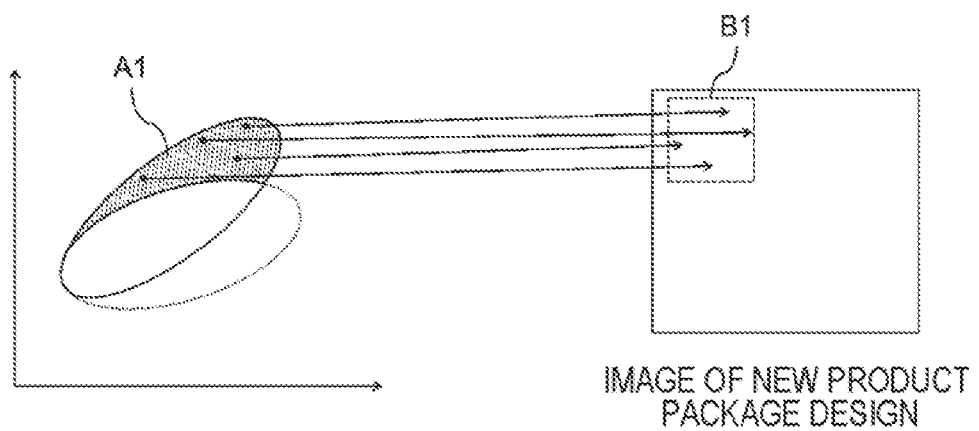
FIG. 7 is a diagram schematically illustrating processing of determining an image region associated with one or more feature values included in a non-overlapping region.

First, the evaluation information output unit 120 determines a region (hereinafter described as a "non-overlapping region") in a spatial distribution (first spatial distribution) of feature values of the new product package design that does not overlap a spatial distribution (second spatial distribution) of feature values of the conventional product package design. For example, a case where the first spatial distribution and the second spatial distribution overlap each other as illustrated in FIG. 6 is considered. FIG. 6 is a diagram illustrating the first spatial distribution and the second spatial distribution in a two-dimensional feature value space. In the example in FIG. 6, an ellipse by a solid line indicates the spatial distribution (first spatial distribution) of the feature values of the new product package design, and an ellipse by a dotted line indicates the spatial distribution (second spatial distribution) of the feature values of the conventional product package design. In this case, the evaluation information output unit 120 determines a region A1 of a hatched portion as the non-overlapping region. Then, the evaluation information output unit 120 determines, in the image of the new product package design, an image region associated with one or more feature values included in the non-overlapping region. In this case, for example, when the differential information generation unit 110 extracts a plurality of feature values from the image of the new product package design, the feature values extracted from the image and positions of pixels associated with the feature values are stored in advance in the memory 1030 or the like. The evaluation information output unit 120 can determine, a position (first image region) of a pixel associated with one or more feature values included in the non-overlapping region, based on a correspondence stored in the memory 1030 or the like (for example: FIG. 7). FIG. 7 is a diagram schematically illustrating processing of determining an image region associated with one or more feature values included in the non-overlapping region. As illustrated in FIG. 7, by determining each pixel associated with each feature value located in the non-overlapping region, the evaluation information output unit 120 can determine the first image region being the image region in the new product package design having a conspicuous change from the conventional product package design. Then, the evaluation information output unit 120 outputs, as evaluation information, the image of the first product package design including information (for example, a rectangular frame B1 in FIG. 7) indicating the determined first image region to the display 24 of the user terminal 20.

With such information, a person in charge of a package design can recognize, at a glance, a portion in the new package design having a conspicuous difference from the conventional package design. Further, with such information, a person in charge of a design development operation can objectively determine whether the new product package design is an intended design.

Further, when the differential information generation unit 110 acquires a difference between spatial distributions of feature values as the differential information, the evaluation information output unit 120 may be configured in such a way as to determine an inconspicuous region as a change of an image of a new product package design, based on the difference between the spatial distributions of the feature values, and output information indicating the region. In this case, the evaluation information output unit 120 operates as follows, for example.

Figure 8:
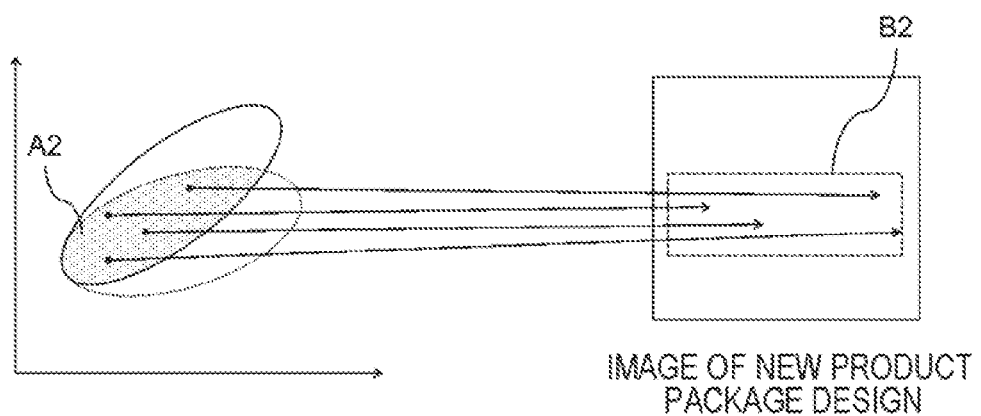
FIG. 8 is a diagram schematically illustrating processing of determining an image region associated with one or more feature values included in an overlapping region.

First, the evaluation information output unit 120 determines a region (hereinafter described as an "overlapping region") in a spatial distribution (first spatial distribution) of feature values of the new product package design that overlaps a spatial distribution (second spatial distribution) of feature values of the conventional product package design. For example, a case where the first spatial distribution and the second spatial distribution overlap each other as illustrated in FIG. 6 is considered. In this case, the evaluation information output unit 120 determines a region A2 filled with dots as the overlapping region. Then, the evaluation information output unit 120 determines, in the image of the new product package design, an image region associated with one or more feature values included in the overlapping region. In this case, for example, when the differential information generation unit 110 extracts a plurality of feature values from the image of the new product package design, the feature values extracted from the image and positions of pixels associated with the feature values are stored in advance in the memory 1030 or the like. The evaluation information output unit 120 can determine a position (second image region) of a pixel associated with one or more feature values included in the overlapping region, based on a correspondence stored in the memory 1030 or the like (for example: FIG. 8). FIG. 8 is a diagram schematically illustrating processing of determining an image region associated with one or more feature values included in the overlapping region. As illustrated in FIG. 8, by determining each pixel associated with each feature value located in the overlapping region, the evaluation information output unit 120 can determine the second image region being the image region in the new product package design having an inconspicuous change from the conventional product package design. Then, the evaluation information output unit 120 outputs, as evaluation information, the image of the first product package design including information (for example, a rectangular frame B2 in FIG. 8) indicating the determined second image region to the display 24 of the user terminal 20.

With such information, a person in charge of a package design can recognize, at a glance, a portion in the new package design having an inconspicuous difference from the conventional package design. Further, with such information, a person in charge of a design development operation can objectively determine whether the new product package design is an intended design.

Note that, the evaluation information output unit 120 may be configured in such a way as to determine both of the first image region and the second image region described above. In this case, the evaluation information output unit 120 outputs, as evaluation information, the image of the first product package design including information indicating the first image region and information indicating the second image region to the display 24 of the user terminal 20.

Second Example Embodiment

In the present example embodiment, a system for supporting shelf allocation business at a store will be exemplified.

System Configuration Example 1

Figure 9:
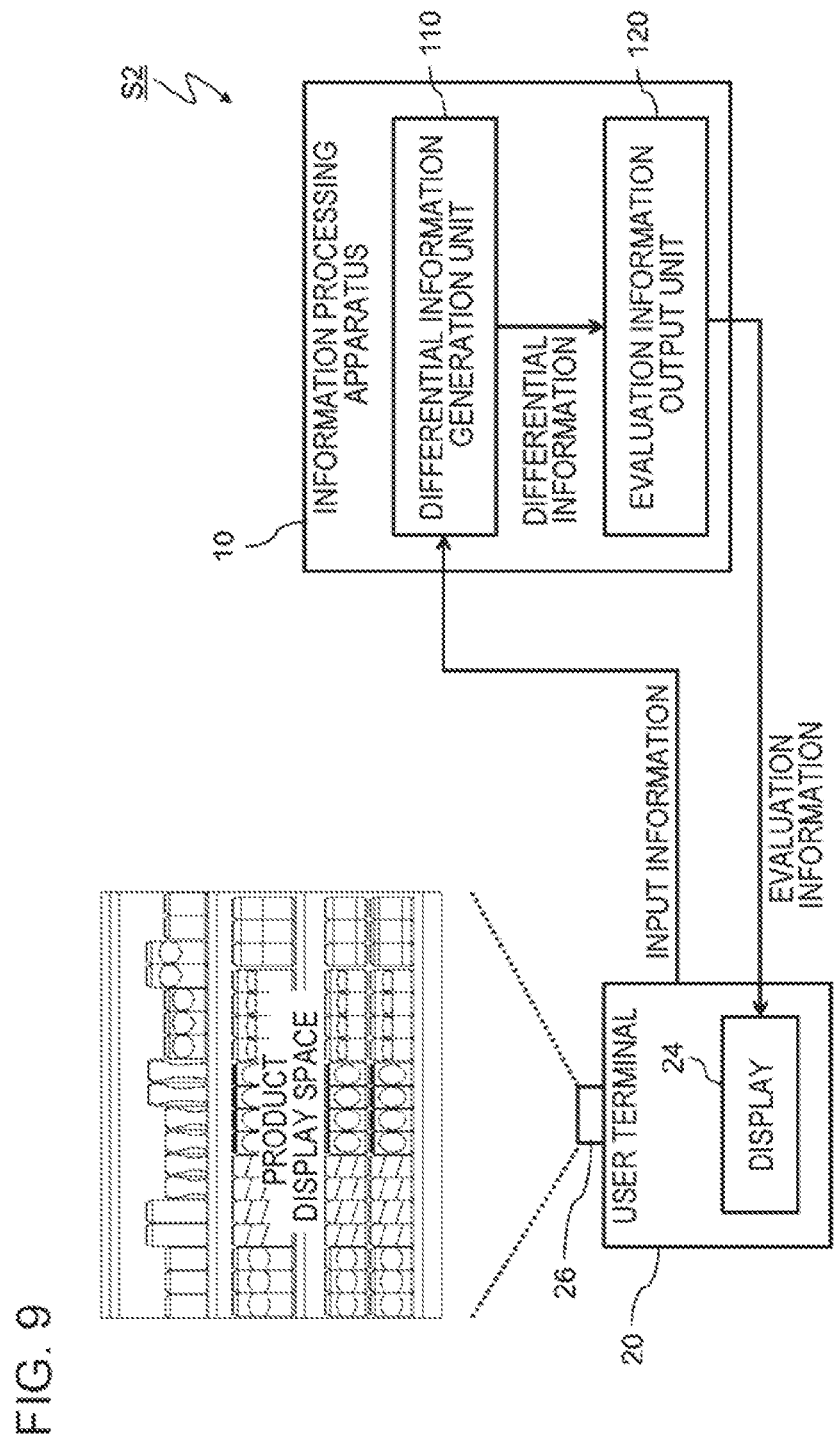
FIG. 9 is a diagram illustrating one example of a shelf allocation support system using the information processing apparatus according to the present invention.

FIG. 9 is a diagram illustrating one example of a shelf allocation support system using an information processing apparatus 10 according to the present invention. A shelf allocation support system illustrated in FIG. 9 is configured in such a way as to include the information processing apparatus 10 and a user terminal 20.

In the example in FIG. 9, the information processing apparatus 10 determines a combination of two product package designs located in a predetermined positional relationship (for example: adjacent in a vertical direction or a horizontal direction) in a product display space, and evaluates a conspicuous degree of a difference between the two product package designs related to the combination. Then, the information processing apparatus 10 outputs, as evaluation information, information indicating an evaluation result of the conspicuous degree of the difference between the two product package designs to the user terminal 20. Details of the processing of the information processing apparatus 10 will be described later.

The user terminal 20 is a portable terminal (for example, a smartphone, a tablet terminal, and the like) used by a person in charge of a shelf allocation operation. Further, an application for the shelf allocation support system S2 is installed in the user terminal 20. The person in charge of the shelf allocation operation performs an operation for activating the application on the user terminal 20, and generating input information. As one example, the person in charge of the shelf allocation operation generates an image of a product display space by using a camera 26 provided in the user terminal 20. The user terminal 20 transmits the generated image of the product display space to the information processing apparatus 10 via a network. Further, when the user terminal 20 receives a processing result (evaluation information related to the conspicuous degree of the difference between the two product package designs located in the predetermined positional relationship in the product display space) by the information processing apparatus 10, the user terminal 20 outputs the processing result to a display 24.

<Flow of Processing>

Figure 10:
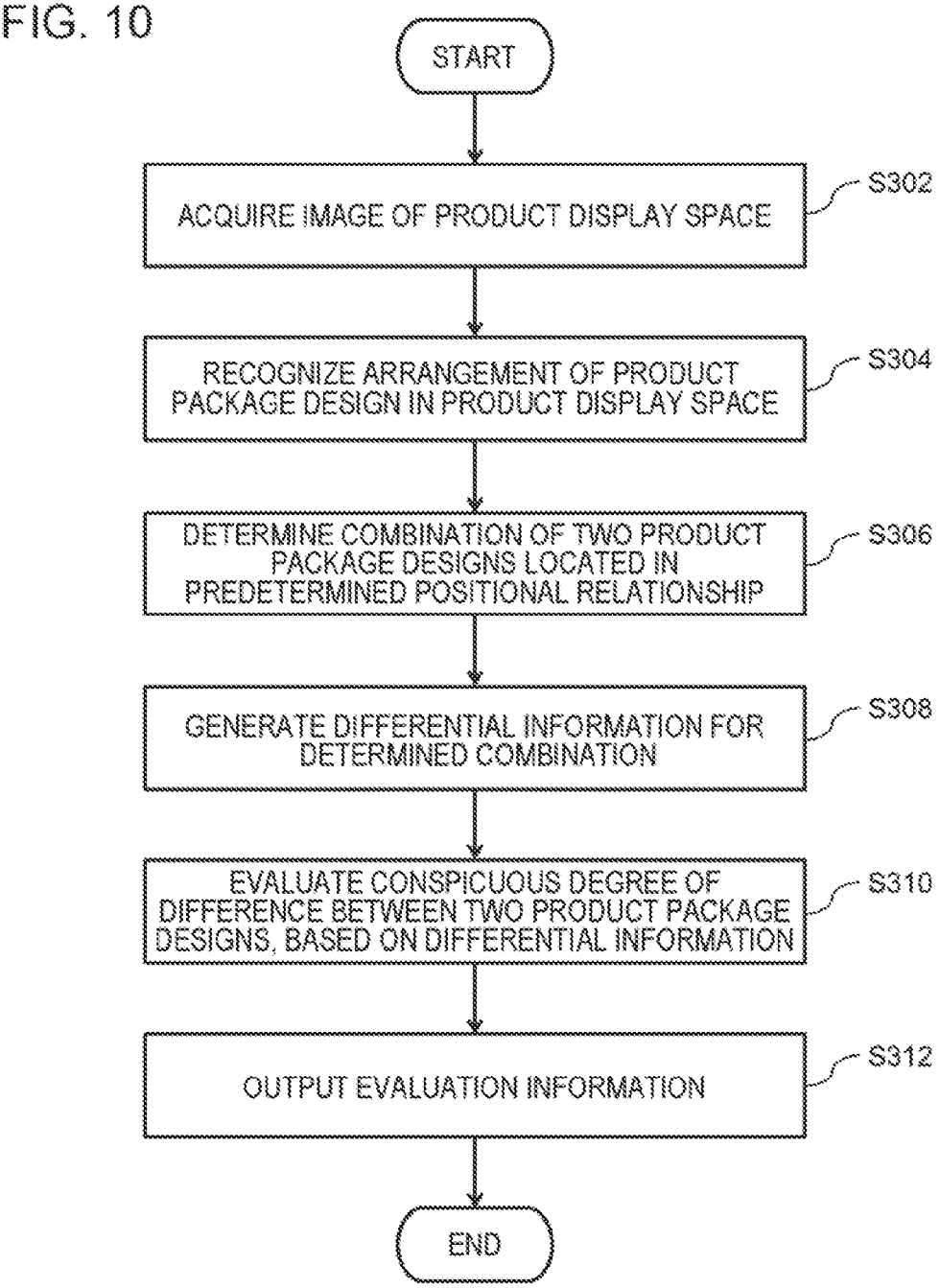
FIG. 10 is a flowchart illustrating a flow of processing performed by the information processing apparatus constituting the shelf allocation support system in FIG. 9.

For example, the information processing apparatus 10 performs processing as illustrated in FIG. 10. FIG. 10 is a flowchart illustrating a flow of the processing performed by the information processing apparatus 10 constituting the shelf allocation support system S2 in FIG. 9.

A differential information generation unit 110 acquires, as input information, an image of a product display space generated by an operation on the user terminal 20 (S302). Then, the differential information generation unit 110 determines a combination of a first product package design and a second product package design, based on the input information. First, the differential information generation unit 110 recognizes an arrangement of a product package design in the product display space by analyzing the acquired image (S304). Then, the differential information generation unit 110 determines a combination of two product package designs located in a predetermined positional relationship (for example, adjacent in the vertical direction or the horizontal direction) as the combination of the first product package design and the second product package design (S306).

Then, the differential information generation unit 110 generates differential information for the combination determined in the processing described above (S308). For example, the differential information generation unit 110 acquires, as the differential information, a result (score that changes according to a degree of similarity between the two product package designs) of recognizing a product of the first product package design by using a machine learning model that is trained to be able to recognize a product of the second product package design. Further, the differential information generation unit 110 may acquire, as the differential information, a difference between a first spatial distribution formed by a plurality of feature values of the first product package design and a second spatial distribution formed by a plurality of feature values of the second product package design. Note that, when a plurality of combinations of the first product package design and the second product package design are determined, the differential information generation unit 110 generates the differential information for each of the combinations.

Then, an evaluation information output unit 120 evaluates a conspicuous degree of the difference between the first product package design and the second product package design, based on the differential information generated by the differential information generation unit 110 (S310). For example, when the differential information generated for a certain combination indicates a difference equal to or less than a predetermined reference value (first reference value), the evaluation information output unit 120 determines that the combination is a combination having an inconspicuous difference in package design. Further, when the differential information generated for a certain combination indicates a difference equal to or more than a second reference value greater than the first reference value, the evaluation information output unit 120 determines that the combination is a combination having a conspicuous difference in package design. The differential information generation unit 110 performs the processing of determining a conspicuous degree of two product package designs on each determined combination. Then, the evaluation information output unit 120 generates evaluation information, based on a result of determining each combination, and outputs the evaluation information to the display 24 provided in the user terminal 20 (S312).

Figure 11:
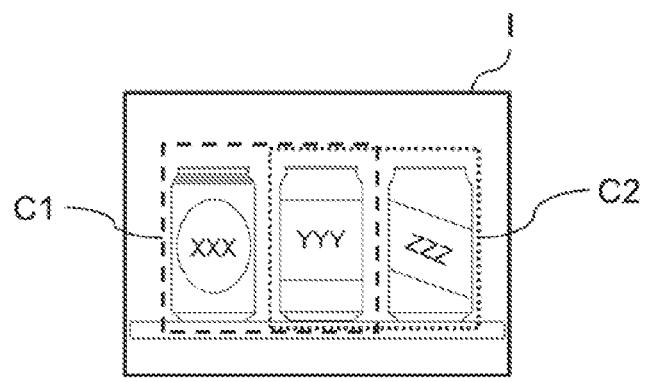
FIG. 11 is a diagram illustrating one example of evaluation information output from an evaluation information output unit.

For example, a screen as illustrated in FIG. 11 is output to the display 24. FIG. 11 is a diagram illustrating one example of evaluation information output from the evaluation information output unit 120. The evaluation information illustrated in FIG. 11 is configured in such a way as to include an image I of a product display space, and information (a display element C1 and a display element C2) indicating an evaluation result of a conspicuous degree of two product package designs. Herein, the rectangular display element C1 indicated by a broken line is information indicating a preferable arrangement of product package designs (a combination having a conspicuous difference between a first product package design and a second product package design). Further, the rectangular display element C2 indicated by a dotted line is information indicating a non-preferable arrangement of product package designs (a combination having an inconspicuous difference between the first product package design and the second product package design). Note that, FIG. 11 is merely one example, and output by the evaluation information output unit 120 is not limited to the example in FIG. 11. For example, the evaluation information output unit 120 may be configured in such a way as to display, in a recognizable manner, a combination having a conspicuous difference and a combination having an inconspicuous difference by color (line color or background color), a fill pattern, a character, a symbol, or a combination of all or some of these.

According to the information as illustrated in FIG. 11, a person in charge of a shelf allocation operation can easily recognize a portion of a preferable arrangement and a portion of a non-preferable arrangement in an arrangement of a product (package design) in a product display space.

System Configuration Example 2

Figure 12:
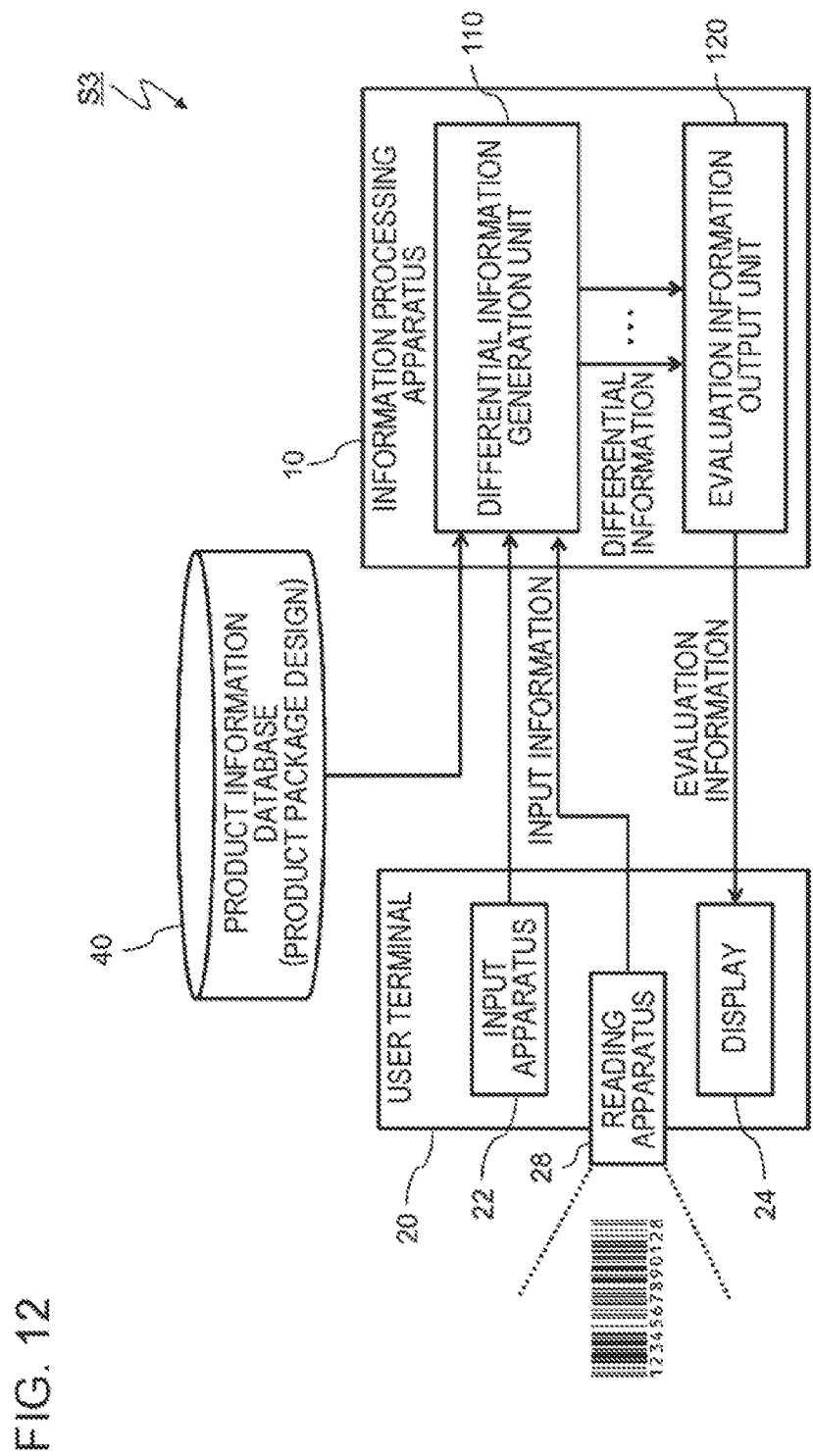
FIG. 12 is a diagram illustrating another example of the shelf allocation support system using the information processing apparatus according to the present invention.

FIG. 12 is a diagram illustrating another example of a shelf allocation support system using an information processing apparatus 10 according to the present invention. A shelf allocation support system S3 illustrated in FIG. 12 is configured in such a way as to include the information processing apparatus 10, a user terminal 20, and a product information database 40.

In the example in FIG. 12, the information processing apparatus 10 evaluates a combination of product package designs that attract attention of a consumer (that have a conspicuous difference in design), based on differential information, and outputs the evaluation result to the user terminal 20. Details of the processing of the information processing apparatus 10 will be described later.

The user terminal 20 is a portable terminal (for example, a smartphone, a tablet terminal, and the like) used by a person in charge of a shelf allocation operation. Further, an application for the shelf allocation support system S3 is installed in the user terminal 20. The person in charge of the shelf allocation operation performs an operation for activating the application on the user terminal 20, and generating input information. As one example, the person in charge of the shelf allocation operation selects a target product (product disposed in a product display space) by operating an input apparatus 22 provided in the user terminal 20, and causes the user terminal 20 to acquire product identification information about the target product. Alternatively, the person in charge of the shelf allocation operation reads a target product by operating a reading apparatus 28 provided in the user terminal 20, and causes the user terminal 20 to acquire product identification information about the target product. The user terminal 20 transmits the acquired product identification information about the target product to the information processing apparatus 10 via a network. Further, when the user terminal 20 receives a processing result (information indicating a combination of product package designs having a conspicuous difference in design) by the information processing apparatus 10, the user terminal 20 outputs the processing result to a display 24.

The product information database 40 stores image data about a product package design of each product in association with product identification information. The information processing apparatus 10 acquires, from the product information database 40, image data about a product package design of each product.

<Flow of Processing>

Figure 13:
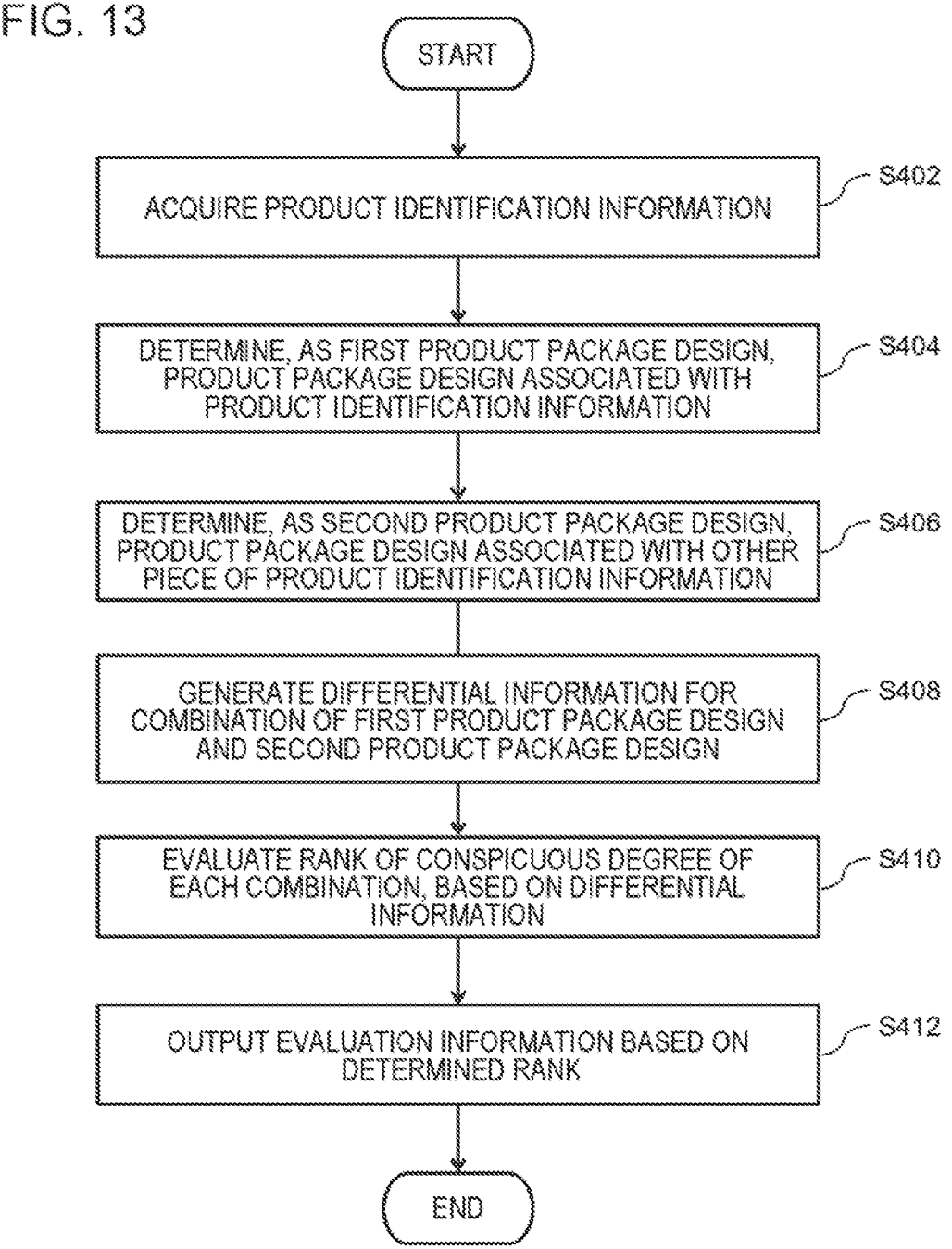
FIG. 13 is a flowchart illustrating a flow of processing performed by the information processing apparatus constituting the shelf allocation support system in FIG. 12.

For example, the information processing apparatus 10 performs processing as illustrated in FIG. 13. FIG. 13 is a flowchart illustrating a flow of the processing performed by the information processing apparatus 10 constituting the shelf allocation support system S3 in FIG. 12.

A differential information generation unit 110 acquires, as input information, product identification information transmitted from the user terminal 20 (S402). Then, the differential information generation unit 110 determines a combination of a first product package design and a second product package design, based on the input information. First, the differential information generation unit 110 refers to the product information database 40 that stores an image of each product package design and the product identification information in association with each other, and determines, as the first product package design, a product package design being associated with the product identification information acquired as the input information (S404). Further, the differential information generation unit 110 refers to the product information database 40, and determines, as the second product package design, a product package design being associated with another piece of the product identification information other than the product identification information acquired as the input information (S406). Note that, a plurality of the second product package designs may be determined in the processing in S406. In this way, at least one combination of the first product package design and the second product package design is determined.

Herein, in the processing in S406, the differential information generation unit 110 may be configured in such a way as to select the second product package design from among package designs of a product belonging to the same category as that of the first product package design. For example, the differential information generation unit 110 may be configured in such a way as to select, as a target product, a product belonging to the same product classification (for example: alcoholic beverages, dairy products, or the like) as that of the first product package design, and determine, as the second product package design, a product package design of the target product. Further, the differential information generation unit 110 may be configured in such a way as to select, as a target product, a product disposed in the same display position (product display space) as that of a product of the first product package design, and determine, as the second product package design, a product package design of the target product. With such a configuration, processing is not performed on a product having a low probability of being disposed in a vicinity in a product display space, and thus an effect of shortening overall processing time is expected.

Referring back to FIG. 13, the differential information generation unit 110 generates differential information for the combination of the first product package design and the second product package design being determined in the processing described above (S408). For example, the differential information generation unit 110 acquires, as the differential information, a result (score that changes according to a degree of similarity between the two product package designs) of recognizing a product of the first product package design by using a machine learning model that is trained to be able to recognize a product of the second product package design. Further, the differential information generation unit 110 may acquire, as the differential information, a difference between a first spatial distribution formed by a plurality of feature values of the first product package design and a second spatial distribution formed by a plurality of feature values of the second product package design. Note that, when a plurality of the second product package designs are determined in the processing in S406, a plurality of combinations of the first product package design and each of the plurality of second product package designs can be acquired. In this case, the differential information generation unit 110 generates the differential information for each of the combinations.

Then, an evaluation information output unit 120 evaluates a conspicuous degree of a difference between the two product package designs related to each of the combinations, based on the differential information generated for the combination of the first product package design and the second product package design. For example, the evaluation information output unit 120 evaluates a rank of a conspicuous degree of each of the combinations, based on magnitude of the difference indicated by the differential information about each of the combinations (S410). Then, the evaluation information output unit 120 determines a preferable combination (a combination that attracts attention of a consumer) of the first product package design and the second product package design, based on the rank determined for each of the combinations, and outputs information indicating the combination to the display 24 provided in the user terminal 20 (S412).

Figure 14:
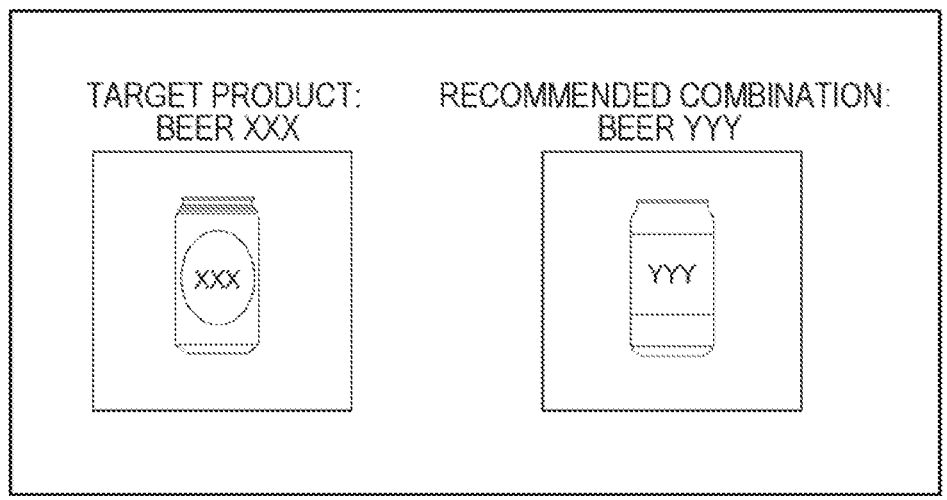
FIG. 14 is a diagram illustrating one example of evaluation information output from the evaluation information output unit.

For example, a screen as illustrated in FIG. 14 is output to the display 24. FIG. 14 is a diagram illustrating one example of evaluation information output from the evaluation information output unit 120. In the example in FIG. 14, the evaluation information output unit 120 outputs, as the evaluation information, a screen that provides, as a recommended combination, a combination of product package designs having the greatest difference indicated by the differential information.

When the person in charge of the shelf allocation operation decides an arrangement position of a product in a product display space, the person can refer to a screen as illustrated in FIG. 14, and easily select a combination of effective products (product package designs) that are more likely to attract attention of a consumer.

Third Example Embodiment

When a product package design is changed, there is a possibility that a product recognition result of a machine learning model may be affected depending on magnitude of the change (a conspicuous degree of the change from a conventional product package design). An information processing apparatus 10 according to the present example embodiment further includes a configuration for reducing an influence of a change in product package design.

Functional Configuration Example

Figure 15:
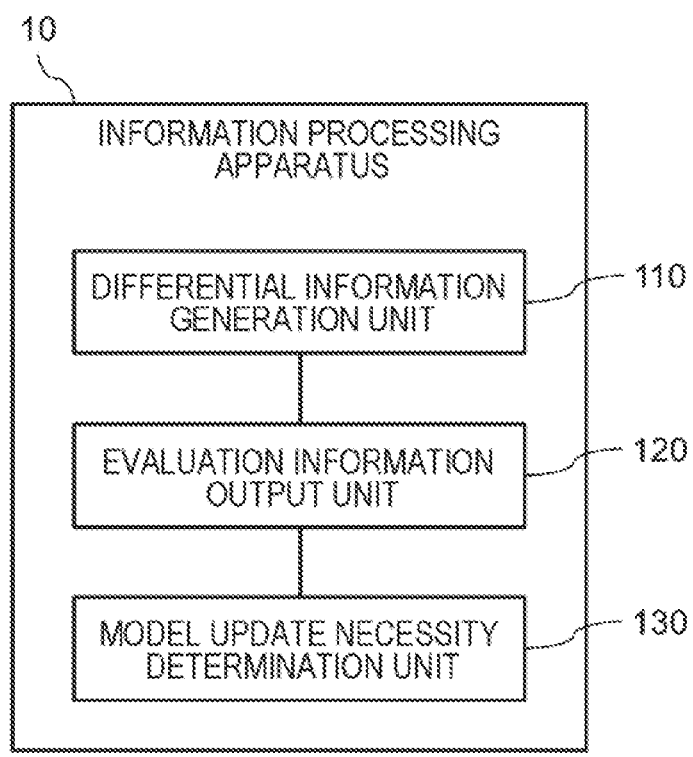
FIG. 15 is a diagram illustrating a functional configuration of an information processing apparatus according to a third example embodiment.

FIG. 15 is a diagram illustrating a functional configuration of the information processing apparatus 10 according to a third example embodiment. As illustrated in FIG. 15, the information processing apparatus 10 according to the present example embodiment further includes a model update necessity determination unit 130. The model update necessity determination unit 130 decides whether update of a machine learning model for product recognition is necessary according to evaluation information output from an evaluation information output unit 120. Specifically, the model update necessity determination unit 130 determines whether update of the machine learning model for product recognition is necessary according to an evaluation result of a conspicuous degree of a difference between a new product package design related to a certain product and a conventional product package design, based on differential information generated for a combination of the new product package design and the conventional product package design, and outputs the determination result to an output apparatus (not illustrated) or the like.

System Configuration Example

Figure 16:
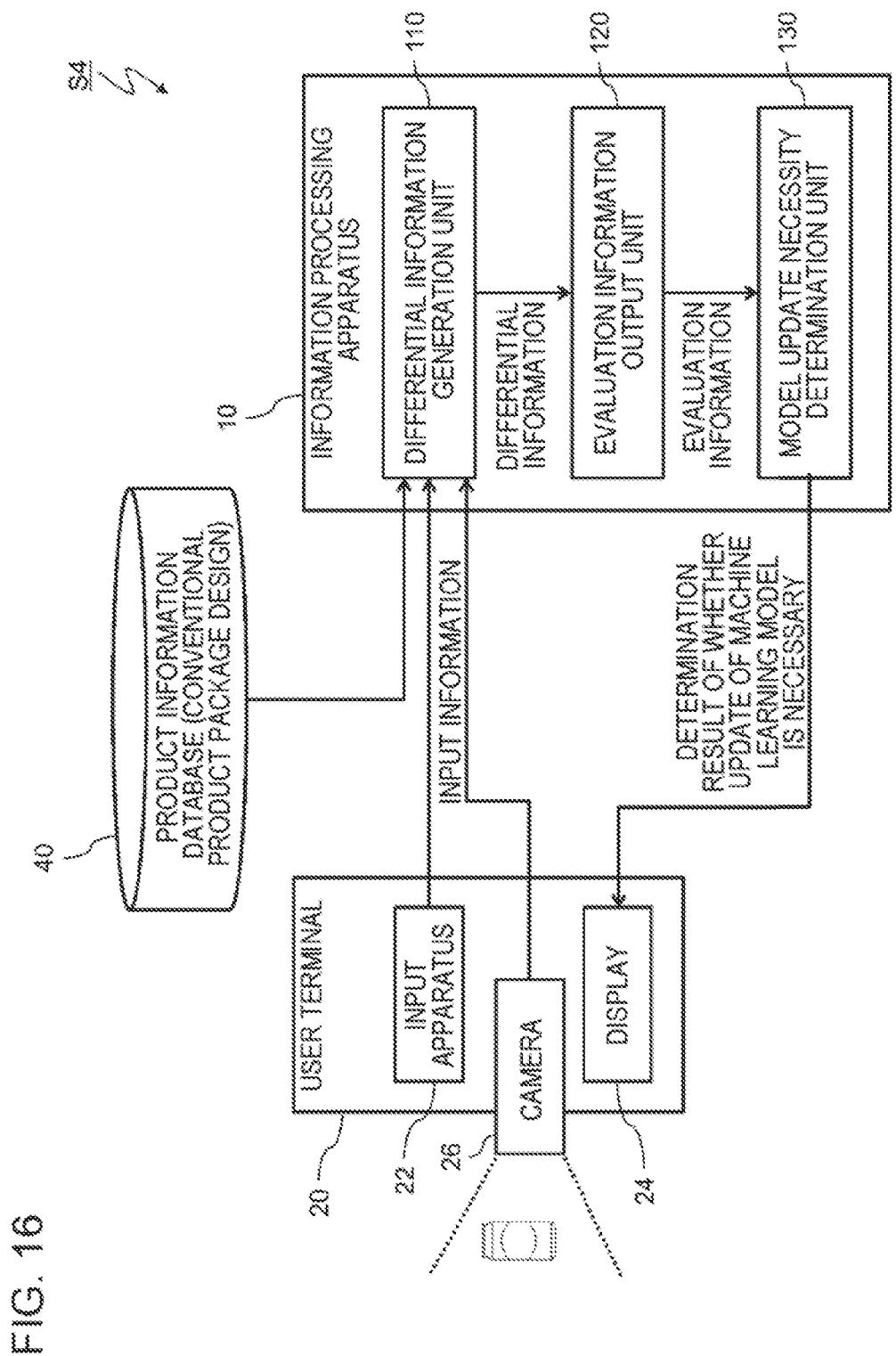
FIG. 16 is a diagram illustrating one example of a management support system using the information processing apparatus according to the third example embodiment.

FIG. 16 is a diagram illustrating one example of a management support system using the information processing apparatus 10 according to the third example embodiment. A model management support system S4 illustrated in FIG. 16 is configured in such a way as to include the information processing apparatus 10, a user terminal 20, and a product information database 40.

In the example in FIG. 16, the information processing apparatus 10 determines whether update of the machine learning model for product recognition is necessary according to evaluation information indicating an evaluation result of a conspicuous degree of a difference between a new product package design of a certain product and a conventional product package design. Further, the information processing apparatus 10 transmits, to the user terminal 20, a determination result of whether update of the machine learning model for product recognition is necessary.

The user terminal 20 is a terminal used by an employee of a store. Further, an application for the model management support system S4 is installed in the user terminal 20. The employee of the store performs an operation for activating the application on the user terminal 20, and generating input information. For example, when a product of a new product package design is arrived for the first time, the employee of the store generates an image of the new product package design by using a camera 26 provided in the user terminal 20. Further, the employee of the store inputs, to the user terminal 20 by using an input apparatus 22 or the like, information (for example: product identification information) indicating which product is a product captured in the generated image. The user terminal 20 transmits, as input information to the information processing apparatus 10, the image of the new product package design of the product and the product identification information about the product. Further, when the user terminal 20 receives a determination result of whether update of the machine learning model is necessary from the information processing apparatus 10, the user terminal 20 outputs the determination result to a display 24.

The product information database 40 stores image data about a product package design (conventional product package design) of each product in association with product identification information. The information processing apparatus 10 acquires, from the product information database 40, image data about a conventional product package design to be a comparison target of a new product package design.

<Flow of Processing>

Figure 17:
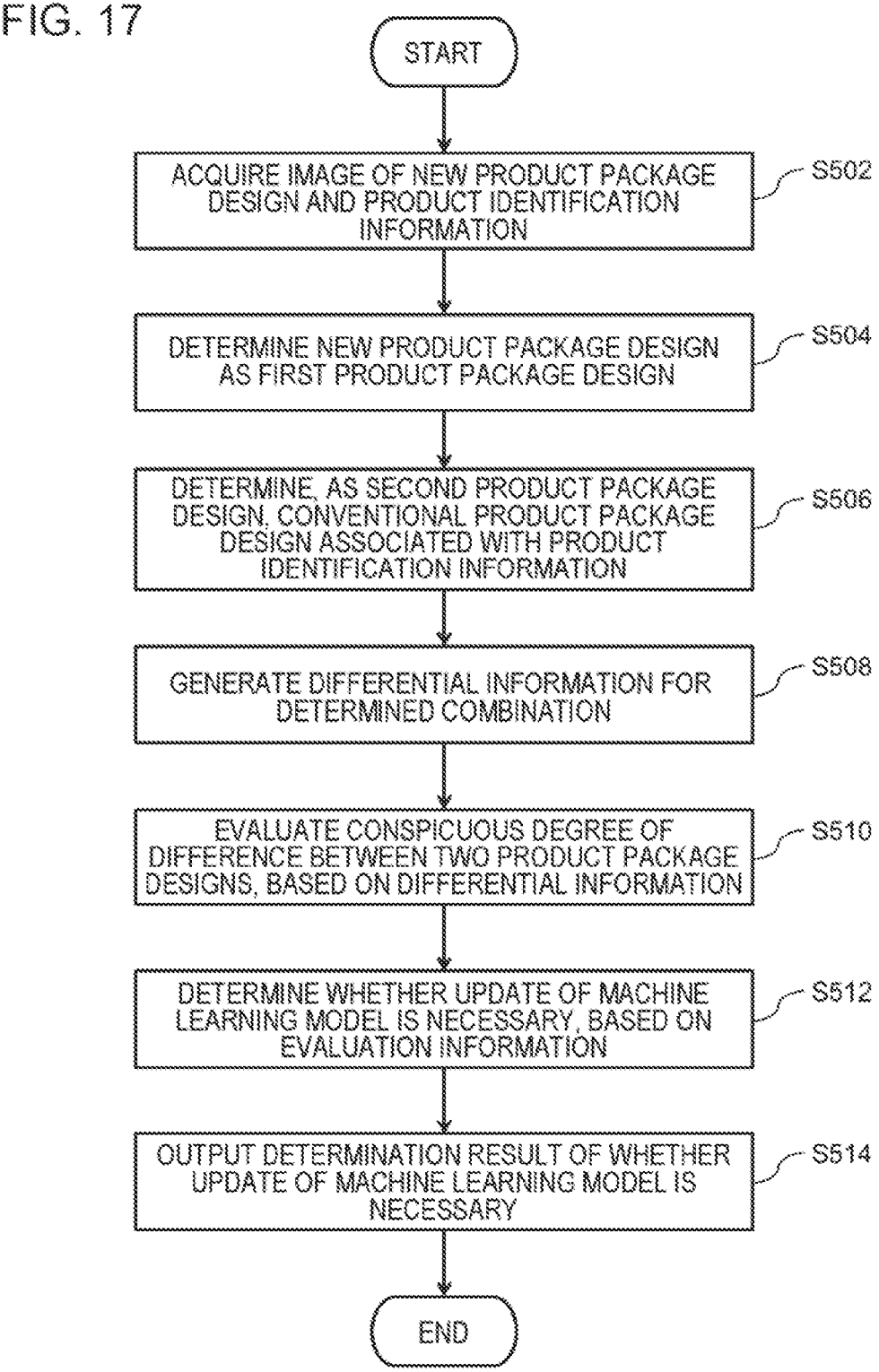
FIG. 17 is a flowchart illustrating a flow of processing performed by the information processing apparatus constituting the model management support system in FIG. 16.

For example, the information processing apparatus 10 performs processing as illustrated in FIG. 17. FIG. 17 is a flowchart illustrating a flow of the processing performed by the information processing apparatus 10 constituting the model management support system S4 in FIG. 16.

The differential information generation unit 110 acquires, as input information, an image of a new package design of a certain product and product identification information about the product that are transmitted from the user terminal 20 (S502). Then, the differential information generation unit 110 determines a combination of a first product package design and a second product package design, based on the input information. Specifically, the differential information generation unit 110 determines, as the first product package design, the new product package design captured in the image acquired as the input information (S504). Further, the differential information generation unit 110 reads, from the product information database 40, an image of a conventional product package design associated with the product identification information acquired as the input information, and determines, as the second product package design, the conventional product package design captured in the image (S506). In this way, the combination of the new package design (first product package design) of the certain product and the conventional product package design (second product package design) is determined.

Then, the differential information generation unit 110 generates differential information for the combination determined in the processing described above (S508). For example, the differential information generation unit 110 acquires, as the differential information, a result (score that changes according to a degree of similarity between the two product package designs) of recognizing the product of the new product package design by using a machine learning model that is trained to be able to recognize the product of the conventional product package design. Further, the differential information generation unit 110 may acquire, as the differential information, a difference between a first spatial distribution formed by a plurality of feature values of the new product package design and a second spatial distribution formed by a plurality of feature values of the conventional product package design.

Then, the evaluation information output unit 120 evaluates a conspicuous degree of the difference between the new product package design and the conventional product package design, based on the differential information generated by the differential information generation unit 110 (S510). For example, when the differential information indicates a difference equal to or less than a predetermined reference value, the evaluation information output unit 120 determines that the difference between the new product package design and the conventional product package design (a change from the conventional product package design) is inconspicuous. Further, when the differential information indicates a difference exceeding the reference value described above, the evaluation information output unit 120 determines that the difference between the new product package design and the conventional product package design (a change from the conventional product package design) is conspicuous. Then, the evaluation information output unit 120 outputs evaluation information indicating the evaluation result to the model update necessity determination unit 130.

The model update necessity determination unit 130 determines whether model update is necessary for the user terminal 20, based on the evaluation information indicating the result of the evaluation in the processing in S510 (S512). For example, when the evaluation information indicating that a difference between the new product package design and the conventional product package design is inconspicuous is acquired, the model update necessity determination unit 130 determines that update of the machine learning model is unnecessary. On the other hand, when the evaluation information indicating that a difference between the new product package design and the conventional product package design is conspicuous is acquired, the model update necessity determination unit 130 determines that update of the machine learning model is necessary. Then, the model update necessity determination unit 130 outputs information indicating the determination result of whether update of the machine learning model is necessary to the display 24 provided in the user terminal 20 (S514). For example, the model update necessity determination unit 130 outputs, to the display 24, a message that recommends relearning of the machine learning model using an image of the new product package design, and the like.

In the example described above, whether there is a possibility that recognition accuracy of the machine learning model for product recognition is affected by a design for a limited period and a renewed product package design is determined, and, when there is such a possibility, a message that prompts relearning of the machine learning model for product recognition is output to a terminal for a system administrator. Such information can cause a person in charge of system administration to recognize that the machine learning model needs to be updated due to a change in product package design. The person in charge of system administration performs retraining of the machine learning model according to the information, and thus a possibility of occurrence of an adverse influence (for example, a delay in business due to failure in correctly recognizing a product, or the like) on store business due to a change in product package design can be reduced.

Fourth Example Embodiment

In the present example embodiment, a system for supporting product order business by using evaluation information related to a difference between two product package designs will be described.

Functional Configuration Example

Figure 18:
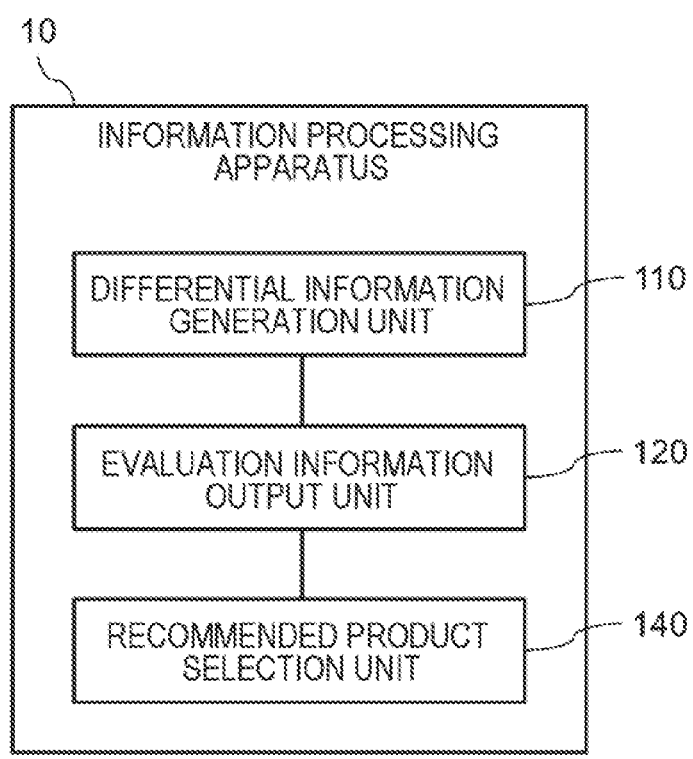
FIG. 18 is a diagram illustrating a functional configuration of an information processing apparatus according to a fourth example embodiment.

FIG. 18 is a diagram illustrating a functional configuration of an information processing apparatus 10 according to a fourth example embodiment. As illustrated in FIG. 18, the information processing apparatus 10 according to the present example embodiment further includes a recommended product selection unit 140. The recommended product selection unit 140 selects a product recommended as an order product, based on evaluation information output from an evaluation information output unit 120. Specifically, the evaluation information output unit 120 according to the present example embodiment decides a rank of a plurality of combinations of a first product package design and a second product package design, based on differential information associated with each of the combinations. Further, the recommended product selection unit 140 selects a product (hereinafter also expressed as a "recommended product") recommended as an order product, based on the rank of the combinations being decided by the evaluation information output unit 120.

System Configuration Example

Figure 19:
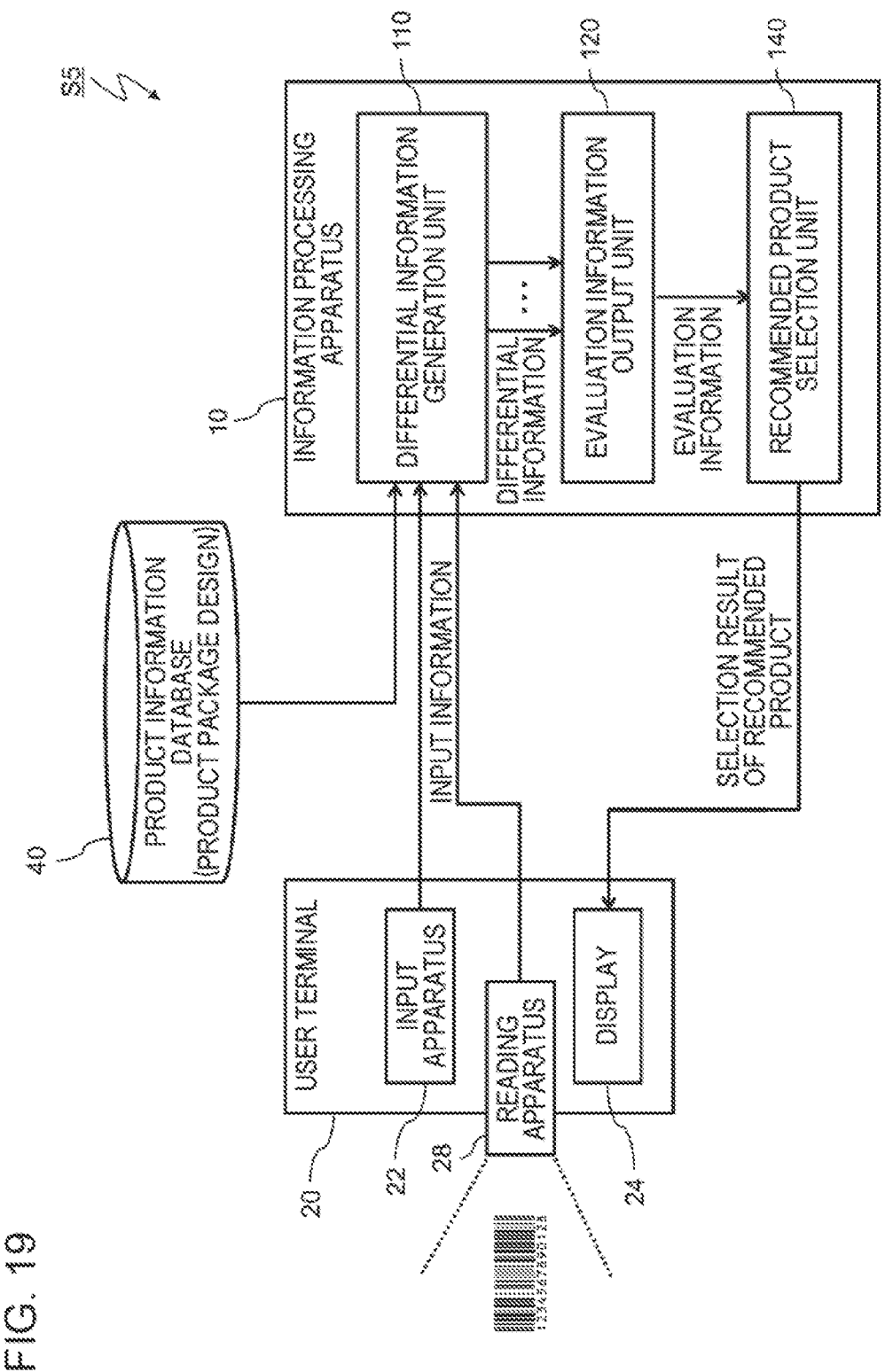
FIG. 19 is a diagram illustrating another example of a product order support system using the information processing apparatus according to the present invention.

FIG. 19 is a diagram illustrating another example of a product order support system using the information processing apparatus 10 according to the present invention. A product order support system S5 illustrated in FIG. 19 is configured in such a way as to include the information processing apparatus 10 and a user terminal 20.

In the example in FIG. 19, the information processing apparatus 10 receives information about an order product specified by a user in the user terminal 20, and selects, as a recommended product, a product having a conspicuous difference in combination with the order product. Further, the information processing apparatus 10 transmits a selection result of the recommended product to the user terminal 20.

The user terminal 20 is a stationary terminal or a portable terminal used by a person in charge of a product order operation. Further, an application for the product order support system S5 is installed in the user terminal 20. The person in charge of the product order operation performs an operation for activating the application on the user terminal 20, and generating input information. As one example, the person in charge of the product order operation specifies an order product by operating an input apparatus 22 provided in the user terminal 20, and causes the user terminal 20 to acquire product identification information about the order product. Alternatively, the person in charge of the product order operation reads a bar code associated with an order product by operating a reading apparatus 28 provided in the user terminal 20, and causes the user terminal 20 to acquire product identification information about the order product. The user terminal 20 transmits the acquired product identification information about the order product to the information processing apparatus 10 via a network. Further, when the user terminal 20 receives a processing result (information indicating a selection result of a recommended product) by the information processing apparatus 10, the user terminal 20 outputs the processing result to a display 24.

<Flow of Processing>

Figure 20:
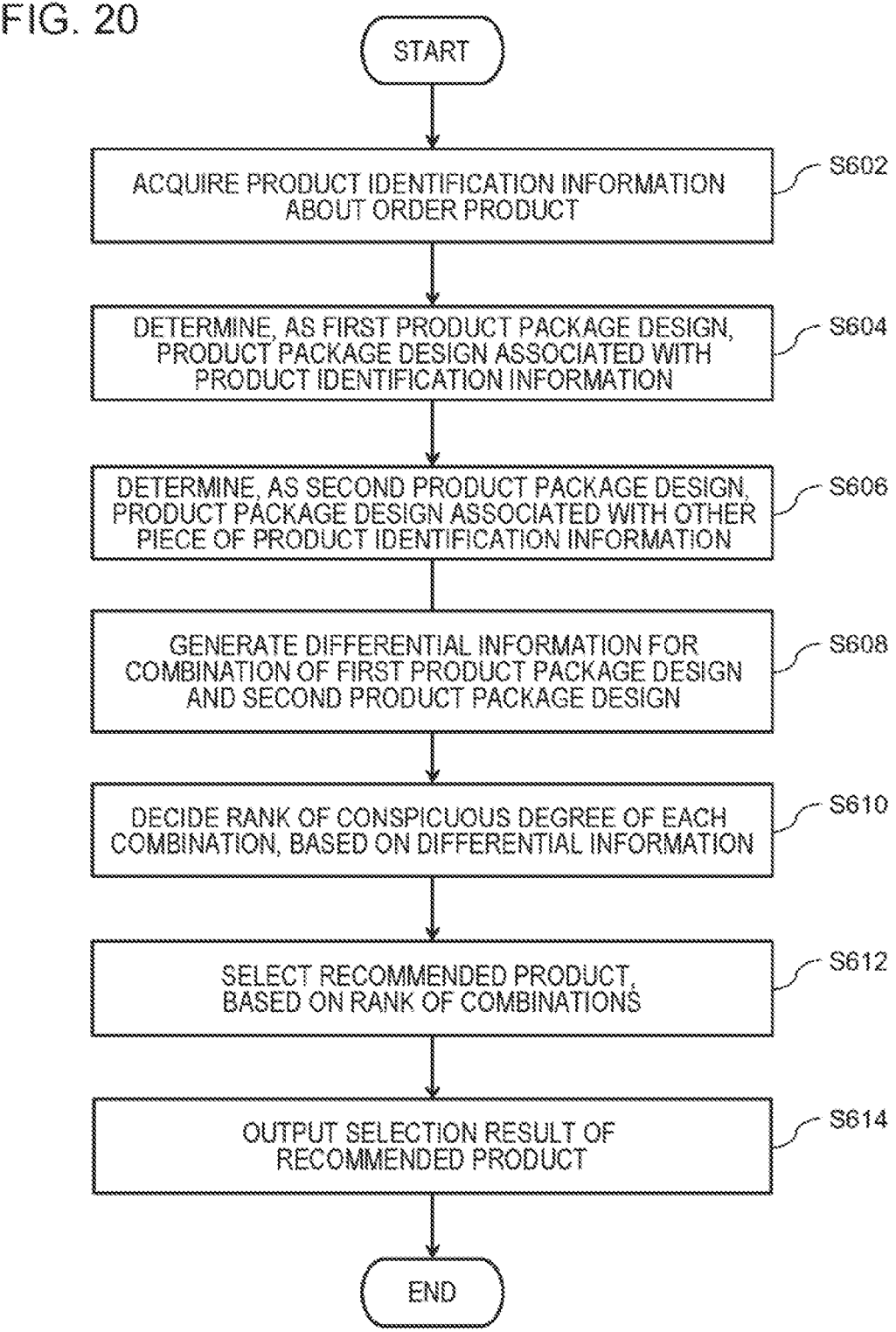
FIG. 20 is a flowchart illustrating a flow of processing performed by the information processing apparatus constituting the product order support system in FIG. 19.

For example, the information processing apparatus 10 performs processing as illustrated in FIG. 20. FIG. 20 is a flowchart illustrating a flow of the processing performed by the information processing apparatus 10 constituting the product order support system S5 in FIG. 19.

A differential information generation unit 110 acquires, as input information, product identification information about an order product being transmitted from the user terminal 20 (S602). Then, the differential information generation unit 110 determines a combination of a first product package design and a second product package design, based on the input information. First, the differential information generation unit 110 refers to the product information database 40 that stores an image of each product package design and the product identification information in association with each other, and determines, as the first product package design, a product package design (product package design of the order product) being associated with the product identification information acquired as the input information (S604). Further, the differential information generation unit 110 refers to the product information database 40, and determines, as the second product package design, a product package design (product package design of a product that may be a recommended product) being associated with another piece of the product identification information other than the product identification information acquired as the input information (S606). Note that, a plurality of the second product package designs may be determined in the processing in S406. In this way, at least one combination of the first product package design and the second product package design is determined.

Herein, in the processing in S606, the differential information generation unit 110 may be configured in such a way as to select the second product package design from among package designs of a product belonging to the same category as that of a product of the first product package design. For example, the differential information generation unit 110 may be configured in such a way as to select, as a target product, a product belonging to the same product classification (for example: alcoholic beverages, dairy products, or the like) as that of the first product package design, and determine, as the second product package design, a product package design of the target product. Further, the differential information generation unit 110 may be configured in such a way as to select, as a target product, a product disposed in the same display position (product display space) as that of a product of the first product package design, and determine, as the second product package design, a product package design of the target product. With such a configuration, processing is not performed on a product having a low probability of being disposed in a vicinity in a product display space, and thus an effect of shortening overall processing time is expected.

Referring back to FIG. 20, the differential information generation unit 110 generates differential information for the combination of the first product package design and the second product package design being determined in the processing described above (S608). For example, the differential information generation unit 110 acquires, as the differential information, a result (score that changes according to a degree of similarity between the two product package designs) of recognizing a product of the first product package design by using a machine learning model that is trained to be able to recognize a product of the second product package design in a recognizable manner. Further, the differential information generation unit 110 may acquire, as the differential information, a difference between a first spatial distribution formed by a plurality of feature values of the first product package design and a second spatial distribution formed by a plurality of feature values of the second product package design. Note that, when a plurality of the second product package designs are determined in the processing in S606, a plurality of combinations of the first product package design and each of the plurality of second product package designs can be acquired. In this case, the differential information generation unit 110 generates the differential information for each of the combinations.

Then, an evaluation information output unit 120 evaluates a conspicuous degree of a difference between the two product package designs related to each of the combinations, based on the differential information generated for the combination of the first product package design and the second product package design. Specifically, the evaluation information output unit 120 decides a rank of a conspicuous degree of each of the combinations, based on magnitude of the difference indicated by the differential information about each of the combinations (S610). Then, the evaluation information output unit 120 outputs evaluation information indicating the rank of the conspicuous degree of each of the combinations to the recommended product selection unit 140.

Figure 21:
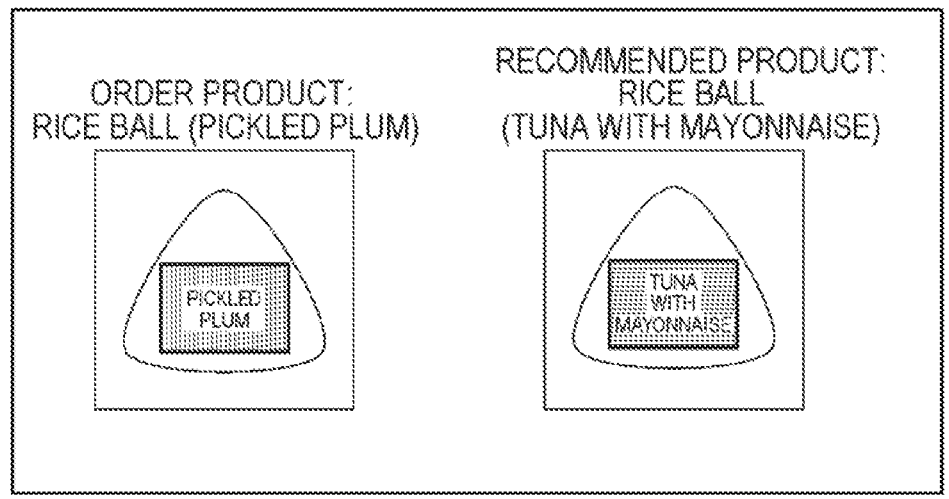
FIG. 21 is a diagram illustrating one example of information output from a recommended product selection unit.

The recommended product selection unit 140 selects a recommended product, based on the rank of each of the combinations indicated by the evaluation information (S612). For example, the recommended product selection unit 140 selects, as a recommended product, a product of the second product package design in a combination at the highest rank among the plurality of combinations. Then, the recommended product selection unit 140 outputs information (for example: FIG. 21) indicating the selection result of the recommended product to the display 24 provided in the user terminal 20 (S614). For example, a screen as illustrated in FIG. 21 is output to the display 24.

FIG. 21 is a diagram illustrating one example of information output from the recommended product selection unit 140. In the example illustrated in FIG. 21, the recommended product selection unit 140 outputs information indicating, as recommendation, a product ("rice ball (tuna with mayonnaise)" in FIG. 21) having the most conspicuous difference from a product package design of a product ("rice ball (pickled plum)" in FIG. 21) specified as an order product. With the information as illustrated in FIG. 21, the person in charge of the product order operation can recognize a second product being effective (being more likely to attract attention of a consumer) when being disposed next to a first product specified as an order product.

As described above, in the present example embodiment, when the person in charge of the product order operation specifies a first product as an order product, information related to a second product having a conspicuous difference (being more likely to attract attention of a consumer) when being disposed next to the first product is output to the user terminal 20. The person in charge of the product order operation can decide an order content (a combination of products to be ordered) that is preferable in terms of shelf allocation by referring to the information output in such a manner.

While the example embodiments of the present invention have been described above with reference to the drawings, the present invention should not be interpreted by being limited to the example embodiments. Various modifications, improvements, and the like can be made based on knowledge of a person skilled in the art without departing from the scope of the present invention. A plurality of components disclosed in the example embodiments can form various inventions by an appropriate combination. For example, some components may be deleted from all the components indicated in the example embodiments, and components in different example embodiments may be appropriately combined.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. An information processing apparatus, including:
   a differential information generation unit that determines a combination of a first product package design and a second product package design, based on input information, and generates differential information indicating magnitude of a difference between the first product package design and the second product package design; and
   an evaluation information output unit that evaluates a conspicuous degree of the difference between the first product package design and the second product package design, based on the differential information, and outputs evaluation information indicating an evaluation result of the conspicuous degree.
2. The information processing apparatus according to supplementary note 1, wherein
   the differential information generation unit acquires, as the differential information, a result of recognizing a product of the first product package design by using a machine learning model that is trained to be able to recognize a product of the second product package design.
3. The information processing apparatus according to supplementary note 1, wherein
   the differential information generation unit acquires, as the differential information, a difference between a first spatial distribution formed by a plurality of feature values of the first product package design and a second spatial distribution formed by a plurality of feature values of the second product package design.
4. The information processing apparatus according to supplementary note 3, wherein
   the evaluation information output unit
      determines a non-overlapping region in the first spatial distribution that does not overlap the second spatial distribution,
      determines a first image region in an image of the first product package design being associated with one or more feature values included in the non-overlapping region, and
      outputs, as the evaluation information, information indicating the first image region.
5. The information processing apparatus according to supplementary note 3 or 4, wherein
   the evaluation information output unit
      determines an overlapping region in the first spatial distribution that overlaps the second spatial distribution,
      determines a second image region in an image of the first product package design being associated with one or more feature values included in the overlapping region, and
      outputs, as the evaluation information, information indicating the second image region.
6. The information processing apparatus according to any one of supplementary notes 1 to 3, wherein
   the evaluation information output unit
      outputs, as the evaluation information, information indicating that the combination is a combination having an inconspicuous difference in package design when the differential information generated for the combination indicates a difference equal to or less than a first reference value, and
      outputs, as the evaluation information, information indicating that the combination is a combination having a conspicuous difference in package design when the differential information generated for the combination indicates a difference equal to or more than a second reference value greater than the first reference value.
7. The information processing apparatus according to any one of supplementary notes 1 to 3, further including
   a product selection unit that selects a product to be recommended as an order product, wherein
   the evaluation information output unit decides, based on the differential information, a rank of a plurality of combinations of the first product package design and the second product package design, and
   the product selection unit selects the product to be recommended, based on the decided rank.
8. The information processing apparatus according to supplementary note 6 or 7, wherein
   the differential information generation unit selects the second product package design from among package designs of a product belonging to a same category as that of a product of the first product package design.
9. The information processing apparatus according to any one of supplementary notes 1 to 3, further including
   a model update necessity determination unit that determines whether update of a machine learning model for product recognition is necessary according to an evaluation result, based on the differential information generated for a combination of a new product package design related to one product and a conventional product package design, of a conspicuous degree of a difference between the new product package design and the conventional product package design.

10. An information processing method, including:
by a computer,
determining a combination of a first product package design and a second product package design, based on input information;
generating differential information indicating magnitude of a difference between the first product package design and the second product package design;
evaluating a conspicuous degree of the difference between the first product package design and the second product package design, based on the differential information; and
outputting evaluation information indicating an evaluation result of the conspicuous degree.

11. The information processing method according to supplementary note 10, further including,
by the computer,
acquiring, as the differential information, a result of recognizing a product of the first product package design by using a machine learning model that is trained to be able to recognize a product of the second product package design.

12. The information processing method according to supplementary note 10, further including,
by the computer,
acquiring, as the differential information, a difference between a first spatial distribution formed by a plurality of feature values of the first product package design and a second spatial distribution formed by a plurality of feature values of the second product package design.

13. The information processing method according to supplementary note 12, further including:
by the computer,
determining a non-overlapping region in the first spatial distribution that does not overlap the second spatial distribution;
determining a first image region in an image of the first product package design being associated with one or more feature values included in the non-overlapping region; and
outputting, as the evaluation information, information indicating the first image region.

14. The information processing method according to supplementary note 12 or 13, further including:
by the computer,
determining an overlapping region in the first spatial distribution that overlaps the second spatial distribution;
determining a second image region in an image of the first product package design being associated with one or more feature values included in the overlapping region; and
outputting, as the evaluation information, information indicating the second image region.

15. The information processing method according to any one of supplementary notes 10 to 12, further including:
by the computer,
outputting, as the evaluation information, information indicating that the combination is a combination having an inconspicuous difference in package design when the differential information generated for the combination indicates a difference equal to or less than a first reference value; and
outputting, as the evaluation information, information indicating that the combination is a combination having a conspicuous difference in package design when the differential information generated for the combination indicates a difference equal to or more than a second reference value greater than the first reference value.

16. The information processing method according to any one of supplementary notes 10 to 12, further including:
by the computer,
deciding, based on the differential information, a rank of a plurality of combinations of the first product package design and the second product package design; and
selecting a product recommended as an order product, based on the decided rank.

17. The information processing method according to supplementary note 15 or 16, further including,
by the computer,
selecting the second product package design from among package designs of a product belonging to a same category as that of a product of the first product package design.

18. The information processing method according to any one of supplementary notes 10 to 12, further including,
by the computer,
determining whether update of a machine learning model for product recognition is necessary according to an evaluation result, based on the differential information generated for a combination of a new product package design related to one product and a conventional product package design, of a conspicuous degree of a difference between the new product package design and the conventional product package design.

19. A program causing a computer to execute the information processing method according to any one of supplementary notes 10 to 18.

What is claimed is:
1. An information processing apparatus comprising:
at least one memory storing instructions; and
at least one processor configured to execute the instructions to perform operations comprising:
determining a combination of a first product package design and a second product package design, based on input information;
generating differential information indicating a magnitude of a difference between the first product package design and the second product package design, by:
acquiring, as the differential information, a difference between a first spatial distribution formed by a plurality of feature values of the first product package design and a second spatial distribution formed by a plurality of feature values of the second product package design;
evaluating a conspicuous degree of the difference between the first product package design and the second product package design, based on the differential information, by:
determining a non-overlapping region in the first spatial distribution that does not overlap the second spatial distribution; and determining a first image region in an image of the first product package design being associated with one or more feature values included in the non-overlapping region; and outputting, as evaluation information indicating an evaluation result of the conspicuous degree, information indicating the first image region.

2. The information processing apparatus according to claim 1, wherein the operations further comprise:

outputting, as part of the evaluation information, information indicating that the combination is a combination having an inconspicuous difference in package design when the differential information generated for the combination indicates a difference equal to or less than a first reference value; and outputting, as part of the evaluation information, information indicating that the combination is a combination having a conspicuous difference in package design when the differential information generated for the combination indicates a difference equal to or more than a second reference value greater than the first reference value.

3. The information processing apparatus according to claim 1, wherein the operations further comprise:

deciding, based on the differential information, a rank of a plurality of combinations of the first product package design and the second product package design; and selecting a product to be recommended as an order product, based on the decided rank.

4. The information processing apparatus according to claim 1, wherein the operations further comprise selecting the second product package design from among package designs of a product belonging to a same category as that of a product of the first product package design.

5. The information processing apparatus according to claim 1, wherein the operations further comprise determining whether update of a machine learning model for product recognition is necessary according to an evaluation result, based on the differential information generated for a combination of a new product package design related to one product and a conventional product package design, of a conspicuous degree of a difference between the new product package design and the conventional product package design.

6. An information processing apparatus comprising:

at least one memory storing instructions; and at least one processor configured to execute the instructions to perform operations comprising:

determining a combination of a first product package design and a second product package design, based on input information;

generating differential information indicating a magnitude of a difference between the first product package design and the second product package design, by:

acquiring, as the differential information, a difference between a first spatial distribution formed by a plurality of feature values of the first product package design and a second spatial distribution formed by a plurality of feature values of the second product package design;

evaluating a conspicuous degree of the difference between the first product package design and the second product package design, based on the differential information, by:

determining an overlapping region in the first spatial distribution that overlaps the second spatial distribution; and determining a second image region in an image of the first product package design being associated with one or more feature values included in the overlapping region; and outputting, as evaluation information indicating an evaluation result of the conspicuous degree, information indicating the second image region.

7. The information processing apparatus according to claim 6, wherein the operations further comprise:

outputting, as part of the evaluation information, information indicating that the combination is a combination having an inconspicuous difference in package design when the differential information generated for the combination indicates a difference equal to or less than a first reference value; and outputting, as part of the evaluation information, information indicating that the combination is a combination having a conspicuous difference in package design when the differential information generated for the combination indicates a difference equal to or more than a second reference value greater than the first reference value.

8. The information processing apparatus according to claim 6, wherein the operations further comprise:

deciding, based on the differential information, a rank of a plurality of combinations of the first product package design and the second product package design; and selecting a product to be recommended as an order product, based on the decided rank.

9. The information processing apparatus according to claim 6, wherein the operations further comprise selecting the second product package design from among package designs of a product belonging to a same category as that of a product of the first product package design.

10. The information processing apparatus according to claim 6, wherein the operations further comprise determining whether update of a machine learning model for product recognition is necessary according to an evaluation result, based on the differential information generated for a combination of a new product package design related to one product and a conventional product package design, of a conspicuous degree of a difference between the new product package design and the conventional product package design.

11. An information processing method performed by a computer and comprising:

determining a combination of a first product package design and a second product package design, based on input information;

generating differential information indicating a magnitude of a difference between the first product package design and the second product package design, by:

acquiring, as the differential information, a difference between a first spatial distribution formed by a plurality of feature values of the first product package design and a second spatial distribution formed by a plurality of feature values of the second product package design;

evaluating a conspicuous degree of the difference between the first product package design and the second product package design, based on the differential information by:

determining a non-overlapping region in the first spatial distribution that does not overlap the second spatial distribution; and determining a first image region in an image of the first product package design being associated with one or more feature values included in the non-overlapping region; and outputting, as evaluation information indicating an evaluation result of the conspicuous degree, information indicating the first image region.

12. The information processing method according to claim 11, further comprising:

outputting, as part of the evaluation information, information indicating that the combination is a combination having an inconspicuous difference in package design when the differential information generated for the combination indicates a difference equal to or less than a first reference value; and outputting, as part of the evaluation information, information indicating that the combination is a combination having a conspicuous difference in package design when the differential information generated for the combination indicates a difference equal to or more than a second reference value greater than the first reference value.

13. The information processing method according to claim 11, further comprising:

deciding, based on the differential information, a rank of a plurality of combinations of the first product package design and the second product package design; and selecting a product to be recommended as an order product, based on the decided rank.

14. The information processing method according to claim 11, further comprising:

selecting the second product package design from among package designs of a product belonging to a same category as that of a product of the first product package design.

15. The information processing method according to claim 11, further comprising:

determining whether update of a machine learning model for product recognition is necessary according to an evaluation result, based on the differential information generated for a combination of a new product package design related to one product and a conventional product package design, of a conspicuous degree of a difference between the new product package design and the conventional product package design.

* * * * *